United States Patent
Takahashi

(10) Patent No.: US 8,920,908 B2
(45) Date of Patent: Dec. 30, 2014

(54) SHEET MATERIAL HAVING A CONCAVE-CONVEX PART, AND VEHICLE PANEL AND LAMINATED STRUCTURE USING THE SAME

(75) Inventor: Masaya Takahashi, Aichi-ken (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 13/979,188

(22) PCT Filed: Dec. 13, 2011

(86) PCT No.: PCT/JP2011/078741
§ 371 (c)(1),
(2), (4) Date: Jul. 11, 2013

(87) PCT Pub. No.: WO2012/098787
PCT Pub. Date: Jul. 26, 2012

(65) Prior Publication Data
US 2013/0295405 A1    Nov. 7, 2013

(30) Foreign Application Priority Data
Jan. 17, 2011 (JP) .................. 2011-006627

(51) Int. Cl.
| | | |
|---|---|---|
| B32B 3/30 | (2006.01) | |
| B32B 3/00 | (2006.01) | |
| B21D 13/00 | (2006.01) | |
| E04C 2/32 | (2006.01) | |
| B32B 3/28 | (2006.01) | |
| B21D 47/00 | (2006.01) | |
| B62D 25/00 | (2006.01) | |
| B62D 25/10 | (2006.01) | |
| B60J 5/04 | (2006.01) | |

(52) U.S. Cl.
CPC . B32B 3/28 (2013.01); B21D 47/00 (2013.01); B62D 25/00 (2013.01); B62D 25/10 (2013.01); B60J 5/045 (2013.01)
USPC ........... 428/180; 428/603; 428/687; 428/182; 428/183; 428/187; 52/783.11; 52/850

(58) Field of Classification Search
USPC ............. 428/598, 687, 595, 604, 603, 59, 60, 428/66.5, 79, 180, 182, 183, 187, 179; 181/284, 293; 52/220.4, 554, 783.11, 52/789.1, 790.1, 798.1, 850; 264/509; D25/138, 152, 157, 141, 143, 144, 125, D25/149, 158, 160, 163; D12/195, 196; D5/54; 296/187.12
See application file for complete search history.

(56) References Cited

U.S. PATENT DOCUMENTS

| 1,074,824 A | 10/1913 | Wadsworth |
| D71,046 S | 9/1926 | Boyd |

(Continued)

FOREIGN PATENT DOCUMENTS

| JP | 59-44366 | 3/1984 |
| JP | 9-254955 | 9/1997 |

(Continued)

OTHER PUBLICATIONS

International Search Report from parent application No. PCT/JP2011/078741.

(Continued)

*Primary Examiner* — Michele L Jacobson
*Assistant Examiner* — Seth Dumbris
(74) *Attorney, Agent, or Firm* — J-Tek Law PLLC; Jeffrey D. Tekanic; Scott T. Wakeman

(57) ABSTRACT

A sheet material (1) includes a stiffness-increasing concave-convex part (20). A first reference plane (K1), an intermediate reference plane (K3), and a second reference plane (K2) serve as a reference system. First unit areas (241) and second unit areas (242) are defined in the intermediate reference plane (K3). Each of the first unit areas (241) and the second unit areas (242) contains first virtual squares (243) and second virtual squares (244). Icosagonal areas that contain only adjacent first virtual squares (243) are designated as first reference areas (213), and icosagonal areas that contain only adjacent second virtual squares (244) are designated as second reference areas (223). The concave-convex part (20) contains first areas (21), which are formed based on the first reference areas (213), as well as second areas (22) and/or plane areas (23), which are formed based on the second reference areas (223).

20 Claims, 12 Drawing Sheets

(56) References Cited

U.S. PATENT DOCUMENTS

| | | | |
|---|---|---|---|
| 1,957,654 A | 5/1934 | La Brie | |
| 2,380,447 A | 7/1945 | Jungersen | |
| 2,481,046 A | 9/1949 | Scurlock | |
| D173,158 S | 10/1954 | Johnson | |
| 2,699,599 A * | 1/1955 | Potchen | 428/604 |
| D178,569 S | 8/1956 | Hutchinson | |
| 2,858,247 A * | 10/1958 | De Swart | 428/180 |
| D188,648 S | 8/1960 | Cohen et al. | |
| 2,954,838 A | 10/1960 | Nuorivaara | |
| D190,068 S | 4/1961 | Vernon | |
| 3,011,602 A | 12/1961 | Ensrud et al. | |
| 3,096,032 A | 7/1963 | Davis | |
| 3,118,523 A | 1/1964 | Girot | |
| 3,302,359 A | 2/1967 | Alleaume | |
| 3,362,118 A | 1/1968 | Brunner | |
| 3,407,788 A | 10/1968 | Hagmann | |
| 4,146,666 A | 3/1979 | Houtlosser | |
| 4,411,121 A | 10/1983 | Blacklin et al. | |
| 4,588,258 A | 5/1986 | Hoopman | |
| 4,672,780 A | 6/1987 | Lockwood | |
| D313,512 S | 1/1991 | Legare | |
| 5,122,902 A | 6/1992 | Benson | |
| 5,292,027 A | 3/1994 | Lueke | |
| 5,399,406 A | 3/1995 | Matsuo et al. | |
| 5,612,117 A | 3/1997 | Belanger et al. | |
| 5,889,615 A | 3/1999 | Dreyer et al. | |
| 6,120,280 A | 9/2000 | Mimura et al. | |
| 6,136,416 A | 10/2000 | Smith et al. | |
| 6,383,607 B1 | 5/2002 | Shin | |
| 6,824,856 B2 * | 11/2004 | Jones | 428/172 |
| D625,110 S | 10/2010 | Koenig | |
| D673,779 S | 1/2013 | Takahashi | |
| D680,749 S | 4/2013 | Takahashi | |
| D680,750 S | 4/2013 | Takahashi | |
| D685,194 S | 7/2013 | Takahashi | |
| 2007/0015000 A1 | 1/2007 | Burdon | |
| 2007/0184144 A1 | 8/2007 | Akishev et al. | |
| 2012/0269998 A1 | 10/2012 | Takahashi | |
| 2013/0108885 A1 | 5/2013 | Takahashi | |

FOREIGN PATENT DOCUMENTS

| | | |
|---|---|---|
| JP | 10-166481 | 6/1998 |
| JP | 11-501587 | 2/1999 |
| JP | 2960402 B1 | 7/1999 |
| JP | 2000-136720 | 5/2000 |
| JP | 2000-257441 | 9/2000 |
| JP | 2000-288643 | 10/2000 |
| JP | 3332353 | 7/2002 |
| JP | 2002-307117 | 10/2002 |
| JP | 2002-307227 | 10/2002 |
| JP | 2002-321018 | 11/2002 |
| JP | 2003-261070 | 9/2003 |
| JP | 2004-26120 | 1/2004 |
| JP | 2004-106022 | 4/2004 |
| JP | 2004-218232 | 8/2004 |
| JP | 2005-232751 | 9/2005 |
| JP | 2006-137029 | 6/2006 |
| JP | 2006-305999 | 11/2006 |
| JP | 2007-23661 | 2/2007 |
| JP | 2007-55143 | 3/2007 |
| JP | 2007-112356 | 5/2007 |
| JP | 2007301865 A | 11/2007 |
| JP | 2008-180125 | 8/2008 |
| JP | 4388558 | 10/2009 |
| JP | 2009-257342 | 11/2009 |
| JP | 2011-27248 | 2/2011 |
| JP | 2011-101893 | 5/2011 |
| JP | 2011-110847 | 6/2011 |
| JP | 2011-147950 | 8/2011 |
| JP | 2011-156581 | 8/2011 |
| JP | 2011-202350 | 10/2011 |
| JP | 2011-230174 | 11/2011 |
| JP | 2012-30261 | 2/2012 |
| WO | 03/056111 | 7/2003 |
| WO | 2005058521 A | 6/2005 |
| WO | 2007/010868 | 1/2007 |
| WO | 2011/058922 | 5/2011 |
| WO | 2012/008059 | 1/2012 |

OTHER PUBLICATIONS

Unpublished U.S. Appl. No. 13/993,492.
Unpublished U.S. Appl. No. 13/979,106.
Unpublished U.S. Appl. No. 13/820,980.
Communication mailed Dec. 10, 2013 from the European patent application in counterpart EP application No. 10854741, including European Search Opinion, Supplementary European Search Report and examined claims 1-13.
Non-final Office Action mailed Jan. 7, 2014 for related U.S. Appl. No. 13/508,822.
English translation of International Preliminary Report on Patentability from parent PCT application No. PCT/JP2011/078741.

* cited by examiner

SHEET MATERIAL HAVING A CONCAVE-CONVEX PART, AND VEHICLE PANEL AND LAMINATED STRUCTURE USING THE SAME

CROSS-REFERENCE

This application is the US national stage of International Patent Application No. PCT/JP2011/078741 filed on Dec. 13, 2011, which claims priority to Japanese Patent Application No. 2011-006627, filed on Jan. 17, 2011.

TECHNICAL FIELD

The present invention relates to a sheet material whose stiffness is increased by the formation of a concave-convex part, and to a vehicle panel and a laminated structure that are configured using the same.

BACKGROUND ART

With the aim of reducing the weight of, for example, an automobile, the potential replacement of the material of components comprising steel sheets and the like with a lightweight material such as an aluminum alloy sheet is being studied and implemented. In such a case, assuming that the weight is reduced, it is necessary that the required stiffness be ensured.

To date, studies conducted to increase stiffness without increasing the thickness of the sheet material have provided the sheet material with a wave shape, a concave-convex shape, and the like, and the stiffness has been increased by virtue of the shape.

As an example of implementing a convex-concave shape, one of the components, called a heat insulator, of an automobile is formed of a sheet material. As a material therefor, Patent Document 1 proposes the formation of numerous protruding parts by embossing in order to ensure sufficient stiffness without increasing sheet thickness. In addition, sheet materials have also been proposed (refer to Patent Documents 2-7) that increase stiffness not only in a heat insulator but also in various applications by forming a concave-convex part via embossing and the like.

PRIOR ART LITERATURE

Patent Documents

Patent Document 1
Japanese Patent No. 4388558
Patent Document 2
Japanese Patent No. 3332353
Patent Document 3
Japanese Unexamined Patent Application Publication No. 2000-257441
Patent Document 4
Japanese Unexamined Patent Application Publication No. H9-254955
Patent Document 5
Japanese Unexamined Patent Application Publication No. 2000-288643
Patent Document 6
Japanese Unexamined Patent Application Publication No. 2002-307117
Patent Document 7
Japanese Unexamined Patent Application Publication No. 2002-321018

SUMMARY

A sheet material wherein corrugations, numerous concave-convex parts, and the like are formed as mentioned above is actually stiffer than a flat sheet in which concave-convex parts are not formed. Nevertheless, the stiffness of a sheet material provided with a corrugated shape has directionality, namely, there are cases wherein even though the stiffness increases in one direction, the desired stiffness increase effect is not obtained in another direction. In addition, in the sheet material provided with the concave-convex part described in Patent Document 1, Patent Document 2, and the like, even though stiffness anisotropy is reduced, the stiffness increase effect thereof is approximately only two times and the weight reduction effect thereof is approximately only 20% of a flat sheet wherein the concave-convex part is not formed, and these effects cannot necessarily satisfy the demand. Consequently, it cannot be said that the optimal concave-convex part shape that both increases stiffness and reduces weight has yet been elucidated, and there is always a demand for further increases in the stiffness increase effect and the weight reduction effect. In addition, apart from the need to reduce weight, there is also anticipation for a material cost reduction effect; when it comes to a sheet material (i.e., a sheet-shaped material), there is demand for increased stiffness and decreased weight—regardless of the material.

In addition, there is demand for a high degree of stiffness over and above that of the conventional art even for, for example, laminated structures that use a sheet material having a concave-convex part that features a high stiffness increase effect, vehicle panels that incorporate a sheet material having a concave-convex part that features a high stiffness increase effect, and the like.

The present invention was conceived considering such problems, and an object of the present invention is to provide a sheet material that increases stiffness by providing a concave-convex part, wherein the sheet material having the concave-convex part pattern exhibits a stiffness increase effect higher than that of the conventional art, and to provide a vehicle panel and a laminated structure using the same.

One aspect of the present invention is a sheet material whose stiffness is increased by the formation of a concave-convex part, wherein a first reference plane, an intermediate reference plane, and a second reference plane, which are three virtual planes that are successively disposed spaced apart and parallel to one another, are used as a reference;

it is assumed that first unit areas and second unit areas, which are virtual rectangles of the same size, are spread out in the intermediate reference plane;

directions parallel to one side of each of the virtual rectangles that constitute the first unit areas and the second unit areas are defined as X directions, and directions perpendicular to the X directions are defined as Y directions;

in the first unit areas and the second unit areas, the virtual squares, which are partitioned by a lattice that is disposed such that sides disposed in the X directions are divided into three equal parts and sides disposed in the Y directions are divided into five equal parts, are categorized into two types, namely, first squares and second squares;

the square at any arbitrary one corner of the first unit areas and the second unit areas is designated as a reference square, a row that comprises squares disposed in the X directions and that includes the reference square is designated a first row, successively adjacent rows are designated as second through fifth rows, a row that comprises squares disposed in the Y directions and that includes the reference square is designated as a row A, and successively adjacent rows are designated as rows B and C;

in each of the first unit areas, all the squares disposed in the first row and the fifth row are the first squares, and, in the second row through the fourth row, the squares disposed in the row A and the row C are the second squares and the squares disposed in the row B are the first squares;

in each of the second unit areas, all the squares disposed in the first row and the fifth row are the second squares, and, in the second row through the fourth row, the squares disposed in the row A and the row C are the first squares and the squares disposed in the row B are the second squares;

in the intermediate reference plane, the first unit areas and the second unit areas are disposed with the same orientation, and, in the Y directions, a plurality of unit area rows, wherein the first unit areas and the second unit areas are alternately disposed in one row, is formed;

the unit area rows that are adjacent in the X directions in the intermediate reference plane are disposed at positions shifted from one another by three squares in the Y directions;

in the intermediate reference plane, an icosagonal area that comprises the first squares that share adjacent sides is designated as a first reference area, and an icosagonal area that comprises the second squares that share adjacent sides is designated as a second reference area;

the concave-convex part is provided with first areas, which protrude from the first reference areas defined in the intermediate reference plane toward the first reference plane, and either or both second areas, which protrude from the second reference areas defined in the intermediate reference plane toward the first reference plane or the second reference plane, and plane areas, which are formed based on the second reference areas in the intermediate reference plane;

each of the first areas comprises a first top surface, which is a projection of the first reference area into the first reference plane at either unity or reduction magnification, and first side surfaces, which connect the contour of that first top surface with the contour of its first reference area; and each of the second areas comprises a second top surface, which is a projection of the second reference area into the first reference plane or the second reference plane at either unity or reduction magnification, and second side surfaces, which connect the contour of that second top surface with the contour of its second reference area.

Another aspect of the present invention is a laminated structure wherein multiple sheet materials are laminated, wherein at least one of the sheet materials is a sheet material that has the abovementioned concave-convex part.

Yet another aspect of the present invention is a vehicle panel that has an outer panel and an inner panel, which is joined to a rear surface of the outer panel, wherein one or both of the inner panel and the outer panel comprises a sheet material that has the abovementioned concave-convex part.

In the sheet material that has the concave-convex part, the concave-convex part is provided with the first areas, which protrude from the first reference areas defined in the intermediate reference plane toward the first reference plane, and either or both second areas, which protrude from the second reference areas defined in the intermediate reference plane toward the first reference plane or the second reference plane, and the plane areas, which are formed based on the second reference areas in the intermediate reference plane.

Because it has such a structure, the sheet material that has the concave-convex part has superior bending stiffness as well as superior energy absorption characteristics.

Although not wishing to be bound by theory, the following provides a possible reason why the stiffness is increased. Namely, each of the first areas comprises: one of the first top surfaces, which is disposed in the first reference plane disposed at a position that is spaced apart from the neutral plane of the sheet material; and the first side surfaces that intersect in the thickness directions of the sheet material. In addition, each of the second areas comprises the second top surface, which is disposed in the first reference plane or the second reference plane, and the second side surfaces, which intersect the sheet material in the thickness directions. In addition, the plane areas are formed based on the second reference areas disposed in the intermediate reference plane. Consequently, a large amount of material can be disposed at a position that is spaced apart from the neutral plane of the sheet material. Accordingly, the large amount of material can be used effectively, and thereby the stiffness increase effect can be increased.

The following considers reasons why the stiffness is increased. Namely, each of the first areas comprises: one of the first top surfaces, which is disposed in the first reference plane disposed at a position that is spaced apart from the neutral plane of the sheet material; and the first side surfaces that intersect in the thickness directions of the sheet material. In addition, each of the second areas comprises the second top surface, which is disposed in the first reference plane or the second reference plane, and the second side surfaces, which intersect the sheet material in the thickness directions. In addition, the plane areas are formed based on the second reference areas disposed in the intermediate reference plane. Consequently, a large amount of material can be disposed at a position that is spaced apart from the neutral plane of the sheet material. Accordingly, the large amount of material can be used effectively, and thereby the stiffness increase effect can be increased.

In particular, the first areas and the second areas are formed based on the first reference areas and the second reference areas, the shapes and the positional relationship of which are set as mentioned above. Thereby, the second moment of area can be improved in an arbitrary cross section, thereby making it possible to obtain a concave-convex shape with a superior stiffness increase effect and low stiffness anisotropy. Thereby, in the material whose sheet thickness is thin, too, the required stiffness can be obtained, and consequently the weight can be reduced. In addition, attendant with the increase in the stiffness, it is also possible to obtain the effect of improving damping characteristics; in addition, the concave-convex shape makes it possible to obtain the effect of suppressing sound reverberations.

In the abovementioned laminated structure, a laminated structure of extremely high stiffness can be easily obtained by using, as part of the abovementioned laminated structure, the sheet material having the concave-convex part that exhibits the stiffness increase effect as mentioned above. In addition, it is possible to obtain the effect of improving the damping characteristics attendant with the increase in stiffness, and to obtain the effect of improving the sound absorbing characteristics by virtue of containing air layers.

In the vehicle panel, the sheet material that has the concave-convex part exhibiting the stiffness increase effect as mentioned above is used in the outer panel or the inner panel, or both, and thereby it is possible to easily obtain a vehicle panel whose stiffness is extremely high. In addition, it is possible to obtain the damping improvement effect attendant with the increase in stiffness, and to obtain the sound absorption improvement effect by virtue of containing air layers.

DETAILED DESCRIPTION OF EMBODIMENTS

Figure 1:
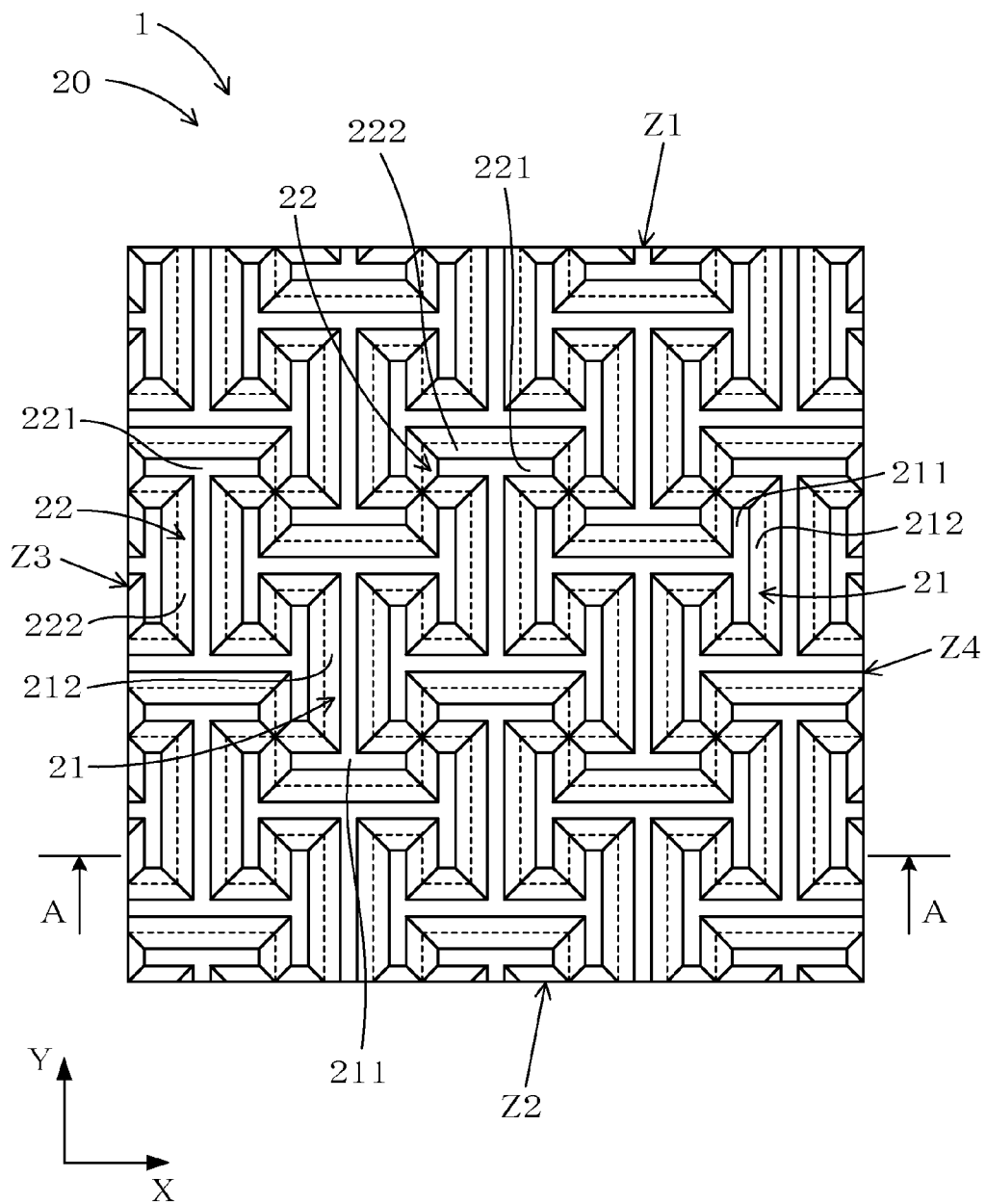
FIG. 1 is a plan view of a sheet material having a concave-convex part according to a first embodiment.

In the present specification, an "icosagon" refers to a figure that has 20 sides and 20 vertices, wherein the vertices are formed by convex angle shapes or concave angle shapes. In addition, none of the expressions of shape, such as an "icosagon" and a "rectangle," are limited to the narrow concepts of geometry; rather, such expressions include shapes that can be generally recognized as those shapes; for example, shapes that would naturally be allowed include shapes wherein the sides are somewhat curved, so-called fillets wherein a round and the like needed for molding is created in a corner part, a surface, and the like, and shapes provided with a so-called curvature.

In addition, the expression "parallel" is not limited to the narrow concept of geometry and may be anything that can generally be recognized as being parallel.

In addition, the configuration of the concave-convex part changes depending on whether either the second areas or the plane areas are formed based on the second reference areas.

If the second areas are formed based on the second reference areas, then the concave-convex part is configured by the first areas and the second areas. At this time, if the second areas are formed such that they protrude from the intermediate reference plane toward the first reference plane, then each of the second areas comprises the second top surface, which is disposed in the first reference plane, and the second side surfaces, which are disposed between the first reference plane and the intermediate reference plane. In addition, if the second areas are formed such that they protrude from the intermediate reference plane toward the second reference plane, then each of the second areas comprises the second top surface, which is disposed in the second reference plane, and the second side surfaces, which are disposed between the second reference plane and the intermediate reference plane.

In addition, if the plane areas are formed based on the second reference areas, then the concave-convex part comprises the first areas and the plane areas.

In addition, it is also possible to form both the second areas and the plane areas based on the second reference areas. In this case, the concave-convex part comprises the first areas, the second areas, and the plane areas.

In addition, it is possible to change, where appropriate, the obtained stiffness and the anisotropy thereof by varying how the second reference areas are distributed in the second areas and the plane areas. At this time, it is preferable that the shape of the concave-convex part, which is formed by two or more of the areas, namely, the first areas, the second areas, and the plane areas, is formed regularly. If the concave-convex part has an irregular shape, then variations in the local stiffness might arise and the stiffness as well as the stiffness anisotropy might become unstable.

In addition, if the second areas are formed such that they protrude from the intermediate reference plane toward the first reference plane and if the plane areas are formed, then two planes, namely, the first reference plane and the intermediate reference plane, are used as a reference; furthermore, if the second areas are formed such that they protrude from the intermediate reference plane toward the second reference plane, then three planes, namely, the first reference plane, the intermediate reference plane, and the second reference plane, are used as a reference.

In addition, the first top surfaces can also be configured by surfaces in the first reference plane or by regions that protrude from the first reference plane in the reverse direction to the direction in which the intermediate reference plane is disposed.

In addition, if the second areas are provided, then the second top surfaces can also be configured by surfaces in the first reference plane or the second reference plane or by regions that protrude in the same direction as the direction in which the second areas protrude. Examples of the shape of the protruding regions include a dome, a ridgeline, and a cone, but the shape of the protruding regions is not limited thereto.

In addition, a length L (mm) of one side of each of the squares and a length M (mm) of the side orthogonal to that one side preferably have the relationship $0.5\,L \leq M \leq 2\,L$. In this case, it is possible to both ensure formability and obtain a sufficient bending stiffness increase effect.

If M is less than $0.5\,L$ or exceeds $2\,L$, then formation becomes problematic and bending stiffness anisotropy becomes large, neither of which is preferable.

In addition, an inclination angle $\theta_1$ (°) of the first side surface with respect to the intermediate reference plane is preferably in the range of 10°-90°, and an inclination angle $\theta_2$ (°) of the second side surface with respect to the intermediate reference plane is preferably in the range of 10°-90°. In this case, it is possible to obtain a concave-convex part shape that has a superior stiffness increase effect while ensuring formability.

If the inclination angle $\theta_1$ (°) of the first side surface and the inclination angle $\theta_2$ (°) of the second side surface are each less than 10°, then it becomes difficult to increase the height with which the first areas and the second areas protrude, which decreases the stiffness increase effect. In addition, if the inclination angle $\theta_1$ (°) of the first side surface and the inclination angle $\theta_2$ (°) of the second side surface each exceed 90°, then forming the concave-convex part will be problematic, and such an area will not be needed.

Furthermore, in a case wherein a metal sheet is press formed, because of problems with formability, the upper limit value of the inclination angle $\theta_1$ (°) of the first side surface and the upper limit value of the inclination angle $\theta_2$ (°) of the second side surface are more preferably less than or equal to 70°. Accordingly, the range is more preferably 10°-70°.

In addition, the first side surface and the second side surface comprise a plurality of surfaces, but it is not necessary for all of those surfaces to have the same inclination angle; for example, the inclination angle may vary with the region. However, every surface is preferably within the abovementioned preferable inclination angle range.

In addition, at least part of the first reference plane, at least part of the intermediate reference plane, and at least part of the second reference plane are preferably parallel curved surfaces.

In this case, the superior sheet material that has the concave-convex part can be deformed into various shapes, and thereby the range of application can be expanded.

In addition, in a sheet material that has the concave-convex part, the sheet material is preferably one wherein the concave-convex part is formed by press forming a metal sheet. The concave-convex part can be easily formed by plastic working a metal sheet such as by press forming, for example, embossing, or by roll forming. Consequently, the superior concave-convex part shape can be adapted to a metal sheet comparatively easily. Various materials that can be plastically worked, such as aluminum alloy, steel, and copper alloy, can be used as the material of the metal sheet.

Furthermore, in addition to plastic working such as rolling, it is also possible to use casting, cutting, and the like as the forming method.

In addition, as long as it has the concave-convex part, the sheet material is also effective with materials other than metal; for example, the sheet material can also be a resin sheet, a laminated sheet of resin and metal, a composite sheet, and the like. In the case of a resin material and the like, the concave-convex part can be formed by, for example, injection molding or hot pressing. Compared with metal material, resin material tends not to be constrained in its formation and has a greater number of degrees of freedom in its design.

In addition, a sheet thickness t (mm) prior to the formation of the metal sheet is preferably 0.03-6.0 mm. When the sheet thickness of the metal sheet is less than 0.03 mm or exceeds 6.0 mm, there is little need to increase its stiffness in application.

In addition, a ratio L/t of the length L (mm) of the one side that forms the squares to the sheet thickness t (mm) is preferably 10-2000.

If the ratio L/t is less than 10, then there is a risk that forming will become difficult; moreover, if the ratio L/t exceeds 2000, then there is a risk that problems will arise, such as it being no longer possible to sufficiently form the concave-convex part shape, and that stiffness will decrease.

In addition, a ratio $H_1/t$ of a protrusion height $H_1$ (mm) of the first area to the sheet thickness t (mm) and the maximum inclination angle $\theta_1$ (°) formed between the first side surface and the intermediate reference plane preferably have the relationship $1 \leq (H_1/t) \leq -3\theta_1 + 272$; and a ratio $H_2/t$ of a protrusion height $H_2$ (mm) of the second area to the sheet thickness t (mm) and the maximum inclination angle $\theta_2$ (°) formed between the second side surface and the intermediate reference plane preferably have the relationship $1 \leq (H_2/t) \leq -3\theta_2 + 272$.

If the ratio $H_1/t$ is less than 1, then there is a risk that a problem will arise wherein the stiffness increase effect produced by the formation of the first areas will not be sufficient.

Moreover, if the ratio $H_1/t$ exceeds $-3\theta_1 + 272$, then there is a risk that a problem will arise wherein forming will become difficult. Likewise, if the ratio $H_2/t$ is less than 1, then there is a risk that a problem will arise wherein the stiffness increase effect produced by the formation of the second areas will not be sufficient. Moreover, if the ratio $H_2/t$ exceeds $-3\theta_2 + 272$, then there is a risk that a problem will arise wherein forming will become difficult.

In addition, in the abovementioned laminated structure, it is possible to configure a laminated body with a three-layer structure wherein the sheet material that has the concave-convex part is used as one core material, and one flat face sheet is provided and disposed on each side thereof. In addition, it is also possible to configure a structure that repeats such a basic structure, namely, a multilayer structure wherein a plurality of the sheet materials, each sheet material having the concave-convex part, is stacked, with a flat face sheet inserted after every sheet material.

In addition, it is also possible to adopt a structure wherein the plurality of sheet materials having the concave-convex parts is directly stacked and used as the core material, and the flat face sheets are joined to a surface on one side thereof or to surfaces on both sides thereof.

In addition, it is also possible to configure a laminated structure in the state wherein the plurality of the sheet materials having the concave-convex parts is just directly stacked. The number of the sheet materials stacked can be modified in accordance with the application and the required characteristics.

In addition, the abovementioned vehicle panel is not limited to the hood of an automobile and can also be adapted to: a panel, such as a door, a roof, a floor, and a trunk lid; a reinforcing member; and an energy absorbing member, such as a bumper, a crush box, a door beam, and the like. In addition, a steel sheet, an aluminum alloy sheet, or the like can also be used as the outer panel and the inner panel.

If the outer panel comprises an aluminum alloy sheet, then, for example, a 6000 series alloy is ideal because it is relatively low cost. In addition, if the inner panel comprises an aluminum alloy sheet, then, for example, a 5000 series alloy sheet is ideal because it has relatively good formability.

EMBODIMENTS

First Embodiment

An embodiment of a sheet material that has a concave-convex part will now be explained, referencing FIG. 1 through FIG. 6.

FIG. 1 is a plan view of a sheet material 1 having a concave-convex part 20 described in the present embodiment; furthermore, the broken lines shown in the same figure indicate the lines of intersection between an intermediate reference plane K3 and the concave-convex part 20.

Figure 6:
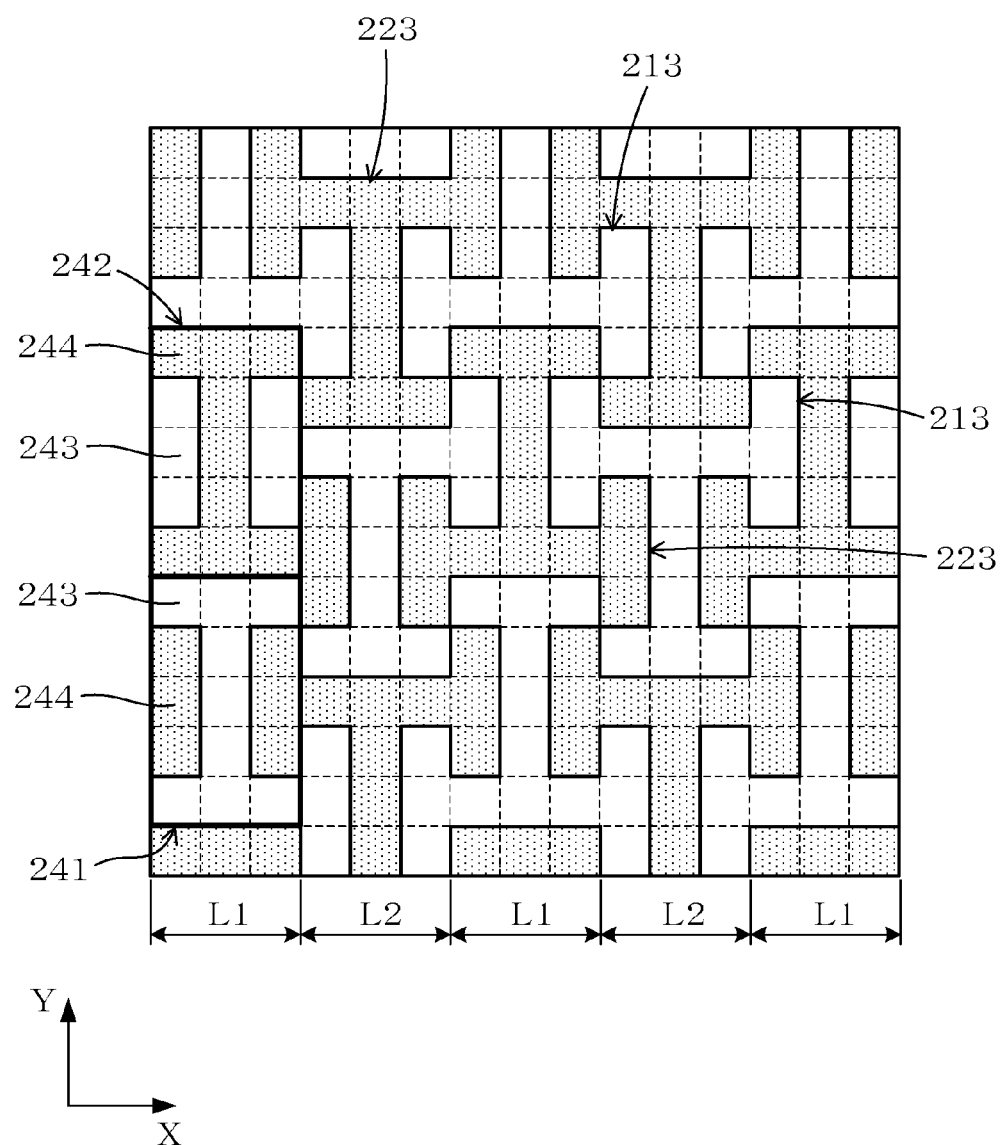
FIG. 6 is an explanatory diagram that shows an intermediate reference plane according to the first embodiment.

In addition, FIG. 6 shows the shape of the concave-convex part 20 of the sheet material 1 described in the present embodiment by the arrangement of first reference areas 213 and second reference areas 223 in the intermediate reference plane K3. In the same figure, the thick solid lines indicate boundaries between first unit areas 241 and second unit areas 242, and the fine solid lines indicate contour lines of the first reference areas 213 and the second reference areas 223. In addition, in the same figure, the broken lines indicate the contour lines of first squares 243 and second squares 244, which are virtual squares.

The sheet material 1 that has the concave-convex part 20 of the present embodiment is one whose stiffness has been increased by the formation of the concave-convex part 20, as shown in FIG. 1 through FIG. 6.

The concave-convex part 20 is configured as follows.

Figure 2:
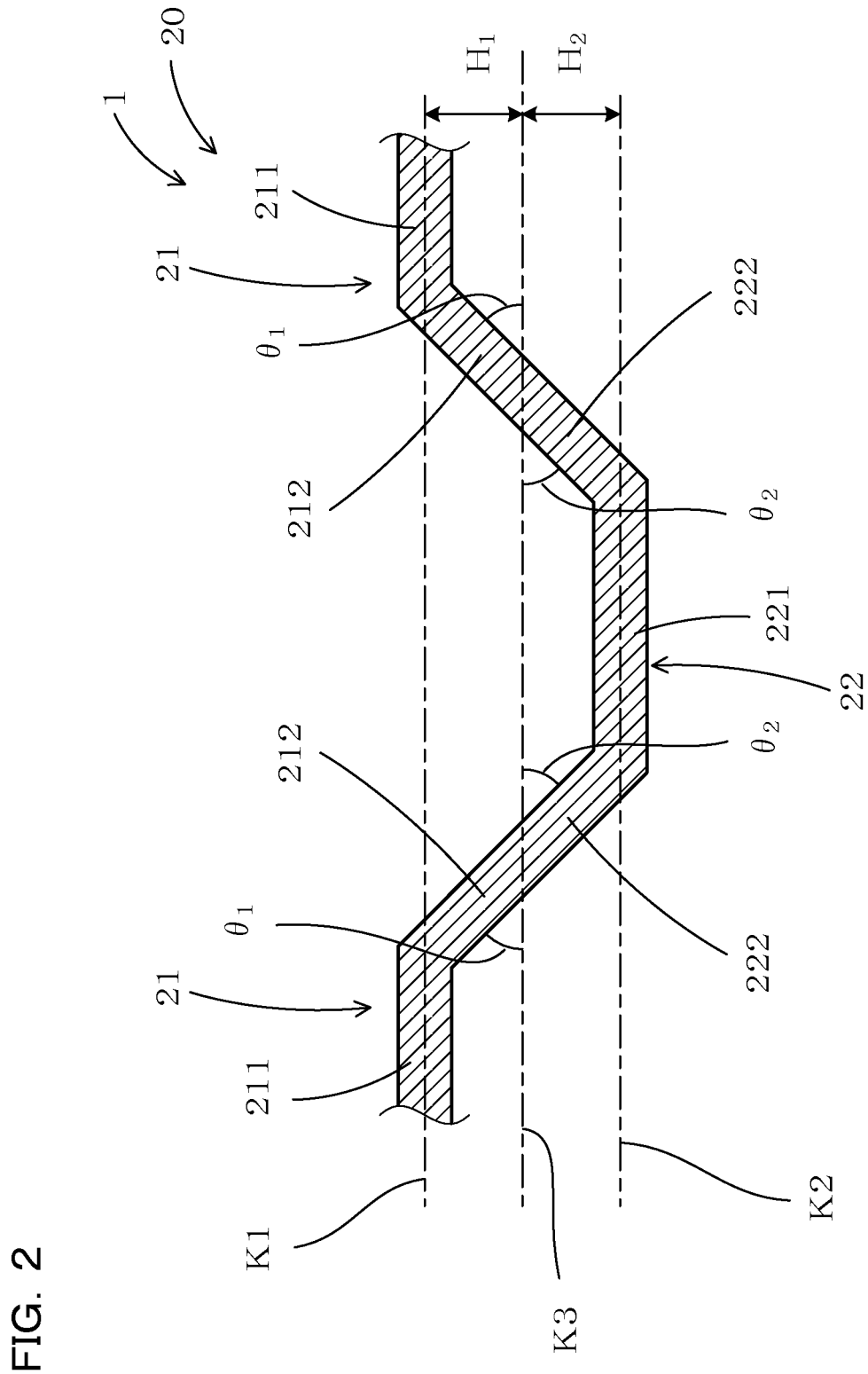
FIG. 2 is a partial enlarged cross sectional view of an auxiliary cross section taken along the A-A line in FIG. 1.

In the concave-convex part 20, as shown in FIG. 2, reference planes—namely, a first reference plane K1, the intermediate reference plane K3, and a second reference plane K2, which are three virtual planes that are successively disposed spaced apart and parallel to one another—are used as a reference. As shown in FIG. 6, it is assumed that the first unit areas 241 and the second unit areas 242, which are virtual rectangles (i.e., squares) of the same size, are spread out in the intermediate reference plane K3.

Figure 4:
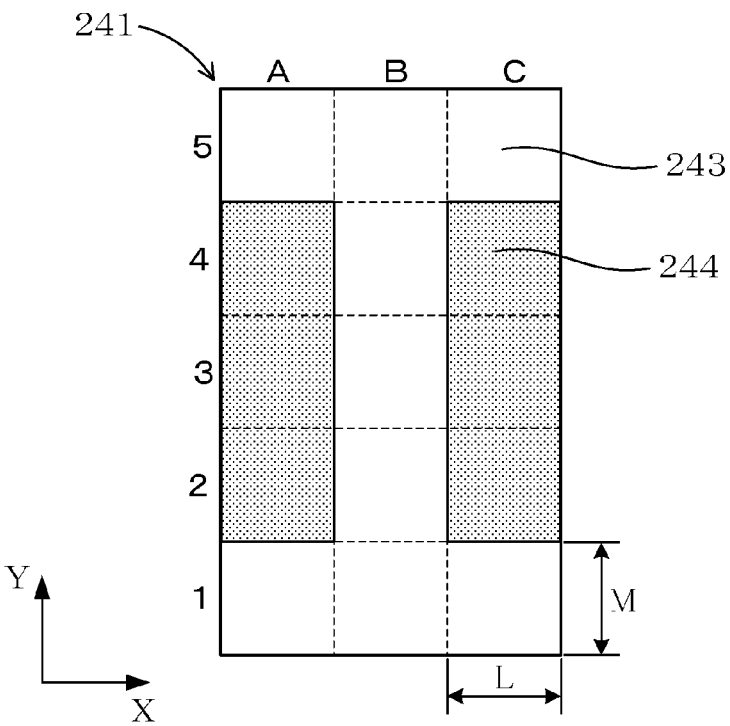
FIG. 4 is an explanatory diagram that shows a first unit area according to the first embodiment.
Figure 5:
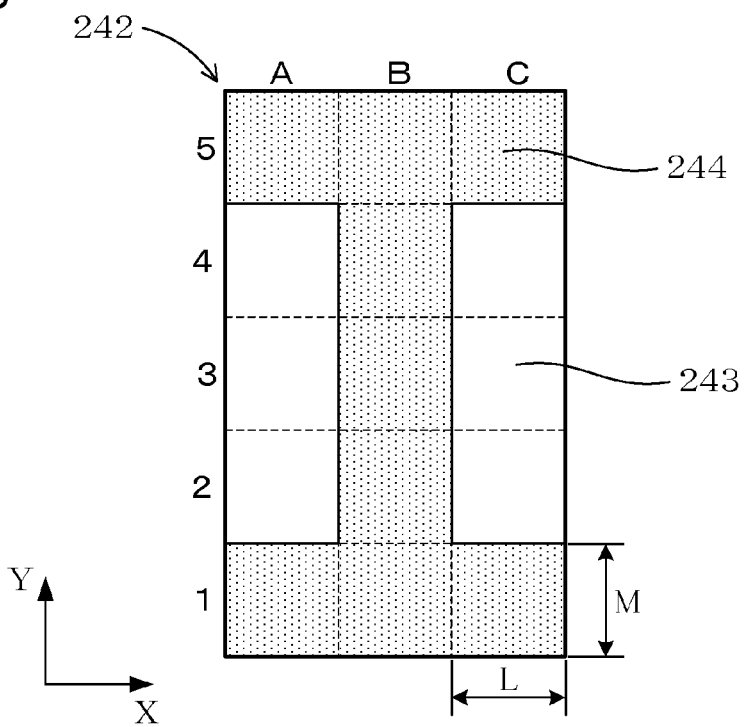
FIG. 5 is an explanatory diagram that shows a second unit area according to the first embodiment.

As shown in FIG. 4 through FIG. 6, directions parallel to one side of the virtual rectangle that constitutes the first unit areas 241 and the second unit areas 242 are defined as the X directions, and the directions perpendicular to the X directions are defined as the Y directions. As shown in FIG. 4 and FIG. 5, in the first unit areas 241 and the second unit areas 242, the virtual squares are categorized into two types, namely, the first squares 243 and the second squares 244, which are partitioned by a lattice that is disposed such that the sides disposed in the X directions are divided into three equal parts, and the sides disposed in the Y directions are divided into five equal parts. The square at any one arbitrary corner of the first unit areas 241 and the second unit areas 242 is designated a reference square, a row that is disposed in the Y directions and that includes the reference square is designated as a row A, and rows that are successively adjacent thereto are designated as either a row B or a row C. In addition, rows that are disposed in the X directions and that include the reference square are designated as a first row, and rows that are successively adjacent thereto are successively designated as a second row through a fifth row.

In the first unit areas 241, as shown in FIG. 4, all the squares disposed in the first row and the fifth row are the first squares 243; furthermore, in the second row through the fourth row, the squares disposed in the row A and the row C are the second squares 244, and the squares disposed in the row B are the first squares 243. In the first unit area 241 disposed in this manner, a substantially I shaped area, which comprises three of the first squares 243 linked in the X directions in the first row and the fifth row and three of the first squares 243 linked in the Y directions and disposed in the row B in the second through fourth rows, and oblong shaped areas, which comprise three of the second squares 244 linked in the Y directions in the second row through the fourth row and disposed in the row A and the row C, are formed.

In addition, as shown in FIG. 5, in the second unit area 242, all the squares disposed in the first row and the fifth row are the second squares 244; furthermore, in the second row through the fourth row, the squares disposed in the row A and the row C are the first squares 243, and the squares disposed in the row B are the second squares 244. In the second unit area 242 disposed in this manner, a substantially I shaped area, which comprises three of the second squares 244 linked in the X directions in the first row and the fifth row and three of the second squares 244 linked in the Y directions in the second row through the fourth row and disposed in the row B, and oblong shaped areas, which comprise three of the first squares 243 linked in the Y directions in the second row through the fourth row and disposed in the row A and the row C, are formed.

As shown in FIG. 6, a plurality of unit area rows L1, L2 is formed in the intermediate reference plane K3, wherein the first unit areas 241 and the second unit areas 242 are arrayed with the same orientation and alternately in one row in the Y directions. The unit area rows L1 and the unit area rows L2 are alternately disposed in the X directions in the intermediate reference plane K3, and the unit area rows L1, L2 that are adjacent are disposed at positions shifted from one another by three squares in the Y directions. In the intermediate reference plane K3, the icosagonal area that comprises the first squares 243 that share adjacent sides are the first reference areas 213, and the icosagonal areas that comprise the second squares 244 that share adjacent sides are the second reference areas 223.

As mentioned above, each of the first reference areas 213 disposed in the intermediate reference plane K3 is an area that combines a substantially I shaped area, which is formed of the first squares 243 in the corresponding first unit area 241, and oblong shaped areas, which comprise the first squares 243 of the second unit areas 242 disposed on both sides, in the X directions, of the three first squares 243 linked in the X directions and disposed in the first row or the fifth row in the substantially I shaped area. In addition, each of the second reference areas 223 is an area that combines a substantially I shaped area, which is formed of the second squares 244 in the corresponding second unit area 242, and oblong shaped areas, which comprise the second squares 244 of the first unit areas 241 disposed on both sides, in the X directions, of the three second squares 244 linked in the X directions and disposed in the first row or the fifth row in the substantially I shaped area.

Figure 3:
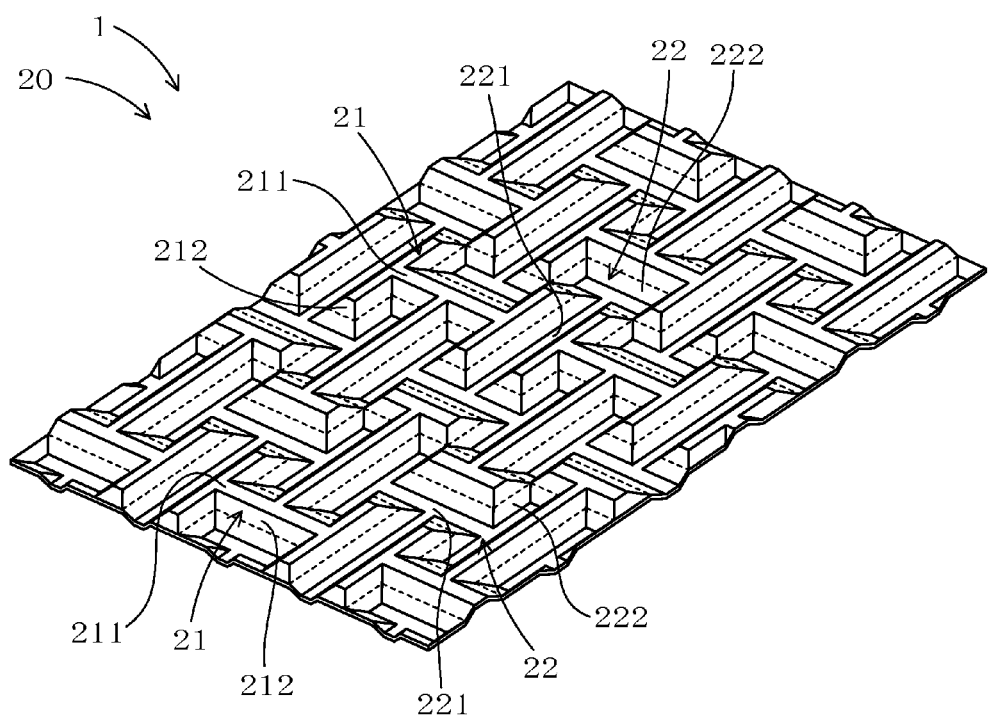
FIG. 3 is an oblique view of the sheet material having the concave-convex part according to the first embodiment.

As shown in FIG. 1 through FIG. 3, the concave-convex part 20 comprises: first areas 21, which protrude from the first reference areas 213 (FIG. 6) defined in the intermediate reference plane K3 (FIG. 6) toward the first reference plane K1; and second areas 22, which protrude from the second reference areas 223 (FIG. 6) defined in the intermediate reference plane K3 toward the second reference plane K2. Each of the first areas 21 comprises: a first top surface 211, which is a projection of its first reference area 213 into the first reference plane K1 at reduction magnification; and first side surfaces 212, which connect the contour of the first top surface 211 with the contour of its first reference area 213. Each of the second areas 22 comprises: a second top surface 221, which is a projection of its second reference area 223 into the second reference plane K2 at reduction magnification; and second side surfaces 222, which connect the contour of that second top surface 221 with the contour of its second reference area 223.

In addition, as shown in FIG. 2, the first reference plane K1, the intermediate reference plane K3, and the second reference plane K2 in the present embodiment are mutually parallel planes. The first top surface 211 is configured such that the center of the sheet thickness thereof overlaps the first reference plane K1, and the second top surface 221 is configured such that the center of the sheet thickness thereof overlaps the second reference plane K2. Furthermore, in the present embodiment, the protrusion height $H_1$ of each of the first areas 21 is 1.5 mm, the protrusion height $H_1$ being the distance between the first reference plane K1 and the intermediate reference plane K3. In addition, in the present embodiment, the protrusion height $H_2$ of each of the second areas 22 is 1.5 mm, the protrusion height $H_2$ being the distance between the second reference plane K2 and the intermediate reference plane K3.

In addition, as shown in FIG. 4 and FIG. 5, the length L (mm) of the sides of the square constituting the first squares 243 and the second squares 244 and that are disposed parallel to the X directions and the length M (mm) of the sides disposed parallel to the Y directions are each 8 mm, and therefore the squares are square shaped.

In addition, as shown in FIG. 2, the inclination angle $\theta_1$ of each of the first side surfaces 212 with respect to the intermediate reference plane K3 and the inclination angle $\theta_2$ of each of the second side surfaces 222 with respect to the intermediate reference plane K3 are each 30°.

In addition, in the present embodiment, the sheet material 1 that has the concave-convex part 20 is a 1000 series aluminum sheet whose sheet thickness t=0.3 mm. The concave-convex part 20 is press formed using a pair of molds. Furthermore, it is also possible to use, as the forming method, some other plastic working method such as roll forming that forms by using a pair of forming rolls, the surfaces of which are profiled with the desired concave-convex shape.

In addition, the ratio L/t of the length L (mm) of the sides disposed parallel to the X directions to the sheet thickness t (mm) of the aluminum sheet is 26.67 and is within a range of 10-2000.

In addition, the ratio $H_1/t$ of the protrusion height $H_1$ (mm) of each of the first areas 21 to the sheet thickness t (mm) is 5. In addition, the inclination angle $\theta_1$ formed by each of the first side surfaces 212 and the intermediate reference plane K3 is 30°, and $-3\theta_1+272=182$. Accordingly, the relationship $1 \leq H_1/t \leq 182$ is satisfied. Likewise, the ratio $H_2/t$ of the protrusion height $H_2$ (mm) of each of the second areas 22 to the sheet thickness t (mm) is 5. In addition, the inclination angle $\theta_2$ formed by each of the second side surfaces 222 and the intermediate reference plane K3 is 30°, and $-3\theta_2+272=182$. Accordingly, the relationship $1 \leq H_2/t \leq 182$ is satisfied.

Next, the operation and effects of the sheet material 1 that has the concave-convex part 20 according to the present embodiment will be explained.

As mentioned above, the concave-convex part 20 is provided with: the first areas 21, which protrude from the first reference areas 213 defined in the intermediate reference plane K3 toward the first reference plane K1; and the second areas 22, which protrude from the second reference areas 223 defined in the intermediate reference plane K3 toward the second reference plane K2. Furthermore, each of the first areas 21 comprises the first top surface 211 and the first side surfaces 212, which connect the contour of that first top surface 211 with the contour of its first reference area 213; in addition, each of the second areas 22 comprises the second top surface 221 and the second side surfaces 222, which connect the contour of that second top surface 221 with the contour of its second reference area 223.

Because it has such a structure, the sheet material 1 having the concave-convex part 20 of the present embodiment has superior bending stiffness as well as superior energy absorption characteristics.

The following considers reasons why the stiffness is increased. Namely, as shown in FIG. 2, each of the first areas 21 comprises: one of the first top surfaces 211, which is disposed in the first reference plane K1 disposed at a position that is spaced apart from the neutral plane of the sheet material 1; and the first side surfaces 212 that intersect in the thickness directions of the sheet material 1. In addition, each of the second areas 22 comprises: one of the second top surfaces 221, which is disposed in the second reference plane K2 disposed at a position that is spaced apart from the neutral plane of the sheet material 1; and the second side surfaces 222 that intersect in the thickness directions of the sheet material 1. Consequently, a large amount of material can be disposed at a position that is spaced apart from the neutral plane of the sheet material 1. Accordingly, the large amount of material can be used effectively, and thereby the stiffness increase effect can be increased.

In particular, the first areas 21 and the second areas 22 are formed based on the first reference areas 213 and the second reference areas 223, with the shape and the positional relationship set as mentioned above. Thereby, the second moment of area can be improved in an arbitrary cross section, thereby making it possible to obtain a concave-convex shape with a superior bending stiffness increase effect and low stiffness anisotropy. In addition, attendant with the increase in the stiffness, it is also possible to obtain the effect of improving damping characteristics; in addition, the concave-convex shape makes it possible to obtain the effect of suppressing sound reverberations. In addition, attendant with the increase in the stiffness, it is also possible to obtain the effect of improving damping characteristics; in addition, the concave-convex shape makes it possible to obtain the effect of suppressing sound reverberations.

(FEM Analysis)

To quantitatively determine the stiffness increase effect of the sheet material 1 of the present embodiment, a bending stiffness evaluation of a cantilevered beam was performed by FEM analysis.

In the FEM analysis, the bending stiffness evaluation was performed in three directions, namely, 0°, 45°, and 90°, by changing the forming direction of the concave-convex part 20 in a test piece.

The test piece used in the FEM analysis has a rectangular shape measuring 120×120 mm, and the concave-convex part 20 is formed over the entire surface thereof. Furthermore, taking the increase in the surface area into consideration, the sheet thickness t was 0.272 mm.

With reference to the end parts of the test piece, one end was designated as a fixed end, and the end part disposed opposing that fixed end was designated as a free end. A load of 1 N was applied to the center part of the side formed by the free end, and the amount of deflection of the sheet material 1 was derived by performing the FEM analysis.

The evaluation was performed by comparing the amount of deflection obtained by conducting the same FEM analysis on the flat sheet shaped original sheet whereon the concave-convex part 20 is not formed.

<0° Direction>

As shown in FIG. 1, in the test piece wherein the concave-convex part 20 is formed such that the X directions in the intermediate reference plane K3 (FIG. 6) and the sides formed by the sheet material 1 are parallel, the direction wherein an end part Z1 located above in the same figure is the fixed end and an end part Z2 opposing the end part Z1 is the free end is designated the 0° direction.

The sheet material 1 that has the concave-convex part 20 of the first embodiment was compared, in the 0° direction discussed above, with the flat sheet shaped original sheet, and it was obvious that the bending stiffness increased by 20.82 times.

<45° Direction>

In the test piece wherein the concave-convex part 20 is formed such that the angle formed between the X directions in the intermediate reference plane K3 (FIG. 6) and the sides of the sheet material 1 is 45°, the direction wherein one end part is the fixed end and an end part opposing the fixed end is the free end is designated the 45° direction.

The sheet material 1 that has the concave-convex part 20 of the first embodiment was compared, in the 45° direction discussed above, with the flat sheet shaped original sheet, and it was obvious that the bending stiffness increased by 14.26 times.

<90° Direction>

As shown in FIG. 1, in the test piece wherein the concave-convex part 20 is formed such that the X directions in the intermediate reference plane K3 (FIG. 6) and the sides of the sheet material 1 are parallel, the direction wherein an end part Z3 located on the left side in the same figure is the fixed end and an end part Z4 opposing the end part Z3 is the free end is designated the 90° direction.

The sheet material 1 that has the concave-convex part 20 of the first embodiment was compared, in the 90° direction discussed above, with the flat sheet shaped original sheet, and it was obvious that the bending stiffness increased by 15.73 times.

Based on the results of the FEM analysis, also with respect to the sheet material 1 that has the concave-convex part 20 described in the present embodiment, in the 45° direction, which is the direction in which the bending stiffness increase effect is the lowest, a stiffness multiplier G is expected to be 14.26 times that of a flat sheet, and a weight reduction factor W (%) is expected to be at least approximately 58% of a flat sheet. Furthermore, the weight reduction factor W (%) is derived using the stiffness multiplier G based on the formula $W=(1-1/\sqrt[3]{G})\times 100$.

In addition, in the present embodiment, the shape of the concave-convex part 20 in the 135° direction is the same as in the 45° direction, and the shape of the concave-convex part 20 in the 180° direction is the same as in the 0° direction. Accordingly, the result of the FEM analysis is the same for both the 135° direction and the 45° direction, and is likewise the same for the 180° direction and the 0° direction.

Second Embodiment

The sheet material 1 having the concave-convex part 20 according to the present embodiment will now be explained, referencing FIG. 7 and FIG. 8.

The present embodiment describes an example wherein the configuration of the concave-convex part 20 has been changed using the same intermediate reference plane K3 (FIG. 6) as in the first embodiment. Furthermore, in the present embodiment, two planes, namely, the first reference plane K1 and the intermediate reference plane K3, are used as a reference, but the second reference plane K2 is not used.

Figure 7:
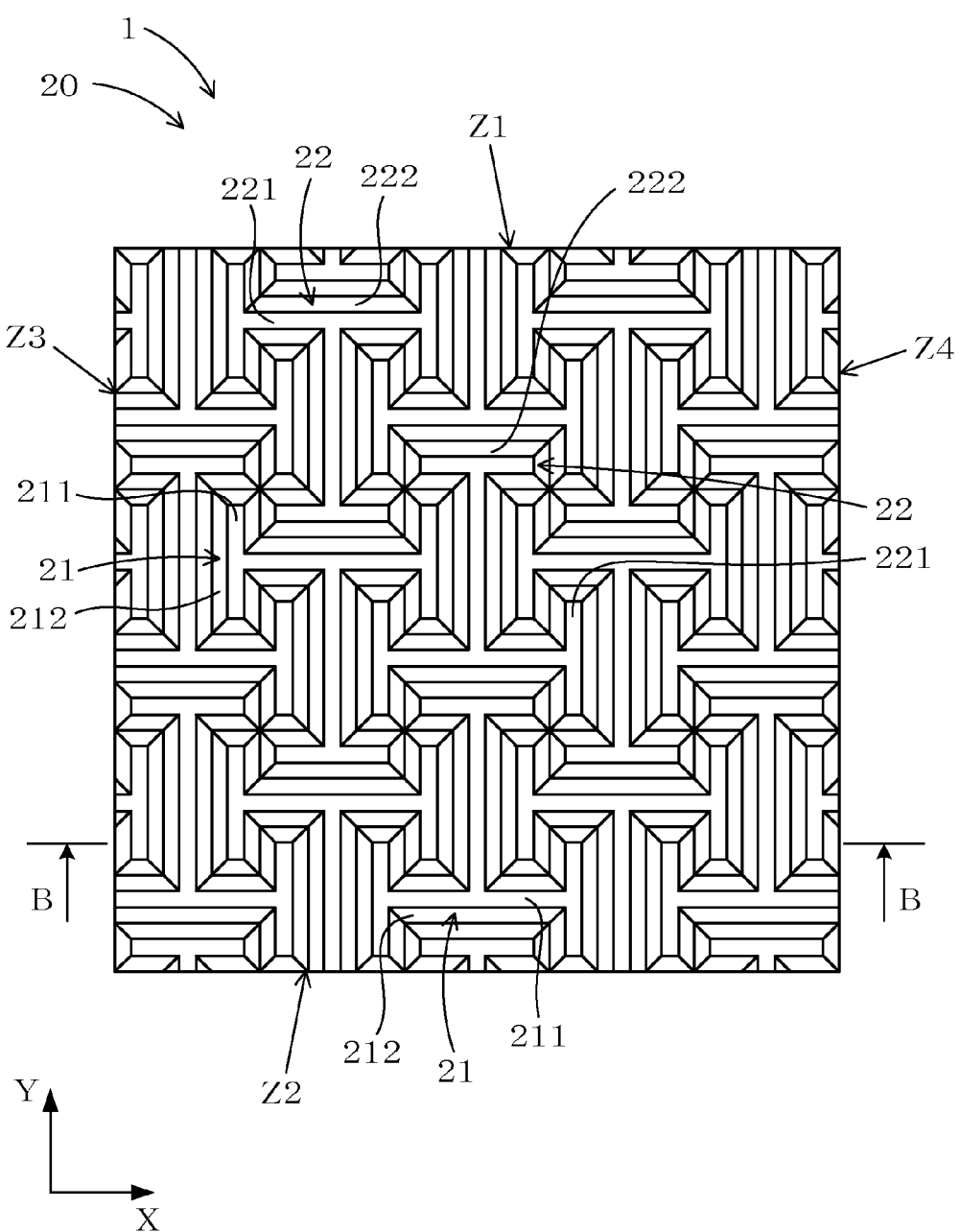
FIG. 7 is a plan view of a sheet material having a concave-convex part according to a second embodiment.
Figure 8:
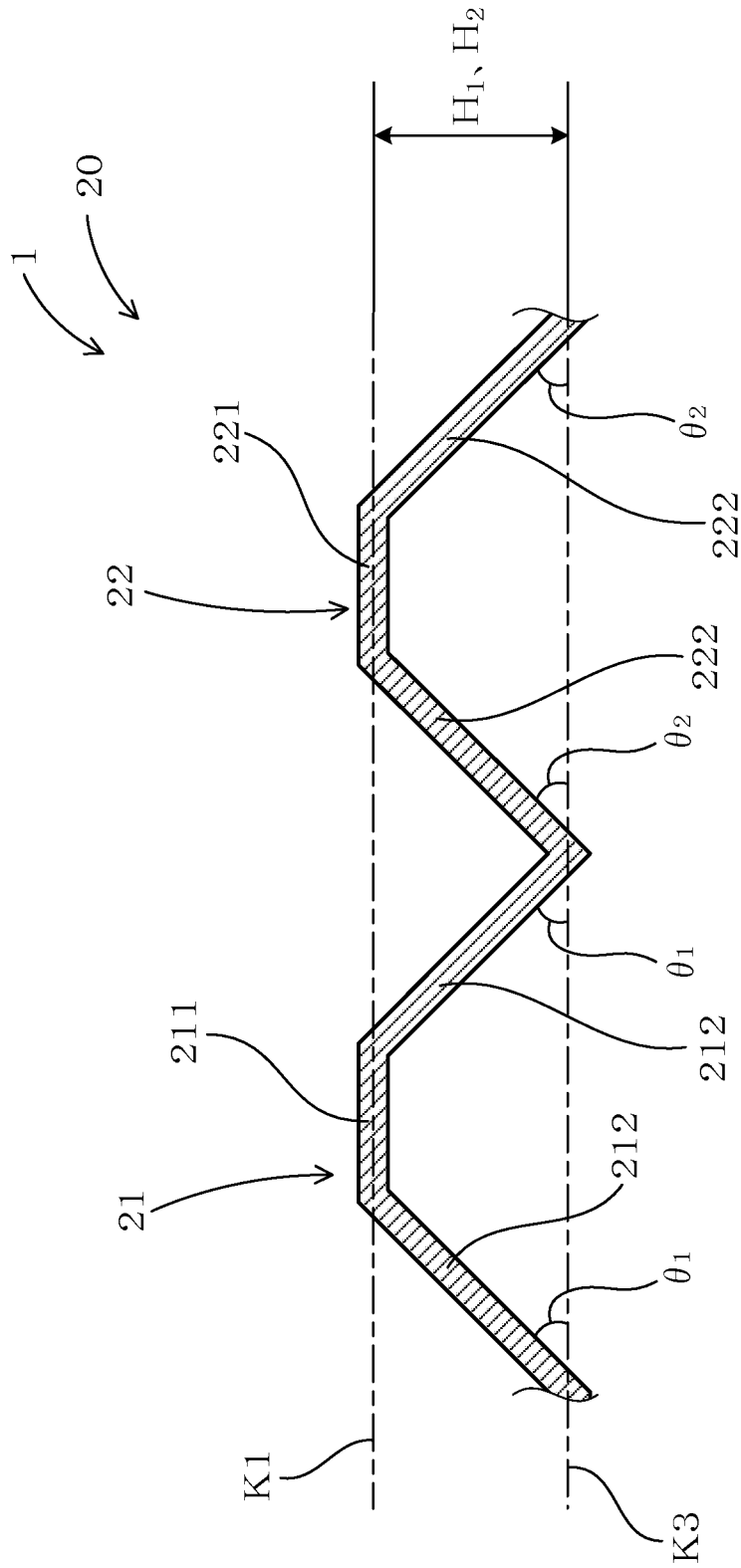
FIG. 8 is a partial enlarged cross sectional view of an auxiliary cross section taken along the B-B line in FIG. 7.

As shown in FIG. 8, the sheet material 1 has the concave-convex part 20 comprising the first areas 21 and the second areas 22, which protrude toward the first reference plane K1. As shown in FIG. 7 and FIG. 8, each of the second areas 22 of the present embodiment comprises the second top surface 221, which is a reduced projection of its second reference area 223 (FIG. 6) into the first reference plane K1, and the second side surfaces 222, which connect the contour of that second top surface 221 and the contour of its second reference area 223. The second areas 22 of the present embodiment are formed such that they protrude from the intermediate reference plane K3 to the first reference plane K1, as described above, and the protrusion direction is the opposite of that of the first embodiment. Accordingly, in the present embodiment, the protrusion height $H_2$ of the second areas 22 is equal to the protrusion height $H_1$ of the first areas 21. Other aspects of the configurations of the first areas 21 and the second areas 22 are the same as those of the first embodiment.

(FEM Analysis)

To quantitatively determine the stiffness increase effect of the sheet material 1 of the present embodiment, a bending stiffness evaluation of a cantilevered beam was performed by FEM analysis.

In the FEM analysis, the bending stiffness evaluation was performed in three directions, namely, 0°, 45°, and 90°, by changing the forming direction of the concave-convex part 20 in a test piece.

The test piece used in the FEM analysis has a rectangular shape measuring 120×120 mm, and the concave-convex part 20 is formed over the entire surface thereof. Furthermore, taking the increase in the surface area into consideration, the sheet thickness t was 0.272 mm.

With reference to the end parts of the test piece, one end was designated as a fixed end, and the end part disposed opposing that fixed end was designated as a free end. A load of 1 N was applied to the center part of the side formed by the free end, and the amount of deflection of the sheet material 1 was derived by performing the FEM analysis.

The evaluation was performed by comparing the amount of deflection obtained by conducting the same FEM analysis on the flat sheet shaped original sheet whereon the concave-convex part 20 is not formed.

<0° Direction>

As shown in FIG. 7, in the test piece wherein the concave-convex part 20 is formed such that the X directions in the intermediate reference plane K3 (FIG. 6) and the sides formed by the sheet material 1 are parallel, the direction wherein the end part Z1 located above in the same figure is the fixed end and the end part Z2 opposing the end part Z1 is the free end is designated the 0° direction.

The sheet material 1 that has the concave-convex part 20 of the second embodiment was compared, in the 0° direction discussed above, with the flat sheet shaped original sheet, and it was obvious that the bending stiffness increased by 5.65 times.

<45° Direction>

In the test piece wherein the concave-convex part 20 is formed such that the angle formed between the X directions in the intermediate reference plane K3 (FIG. 6) and the sides of the sheet material 1 is 45°, the direction wherein one end part is the fixed end and an end part opposing the fixed end is the free end is designated the 45° direction.

The sheet material 1 that has the concave-convex part 20 of the first embodiment was compared, in the 45° direction discussed above, with the flat sheet shaped original sheet, and it was obvious that the bending stiffness increased by 4.08 times.

<90° Direction>

As shown in FIG. 7, in the test piece wherein the concave-convex part 20 is formed such that the X directions in the intermediate reference plane K3 (FIG. 6) and the sides of the sheet material 1 are parallel, the direction wherein the end part Z3 located on the left side in the same figure is the fixed end and the end part Z4 opposing the end part Z3 is the free end is designated the 90° direction.

The sheet material 1 that has the concave-convex part 20 of the second embodiment was compared, in the 90° direction discussed above, with the flat sheet shaped original sheet, and it was obvious that the bending stiffness increased by 5.35 times.

In the 0°, 45°, and 90° directions, too, it is obvious that the sheet material 1 that has the concave-convex part 20 described in the present example exhibits a superior bending stiffness increase effect and extremely low bending stiffness anisotropy. In addition, with respect to the sheet material 1 that has the concave-convex part 20 described in the present embodiment, in the 45° direction, which is the direction in which the bending stiffness increase effect is the lowest, the stiffness multiplier G is expected to be 4.08 times that of a flat sheet, and the weight reduction factor W (%) is expected to be at least approximately 37% of a flat sheet. Furthermore, the weight reduction factor W (%) is derived using the stiffness multiplier G based on the formula $W=(1-1/\sqrt[3]{G})\times 100$.

In addition, in the present embodiment, the shape of the concave-convex part 20 in the 135° direction is the same as in the 45° direction, and the shape of the concave-convex part 20 in the 180° direction is the same as in the 0° direction. Accordingly, the result of the FEM analysis is the same for both the 135° direction and the 45° direction, and is likewise the same for the 180° direction and the 0° direction.

Third Embodiment

The sheet material 1 having the concave-convex part 20 according to the present embodiment will now be explained, referencing FIG. 9 and FIG. 10.

The present embodiment describes an example wherein the configuration of the concave-convex part 20 has been changed using the same intermediate reference plane K3 (FIG. 6) as in the first embodiment and the second embodiment. Furthermore, in the present embodiment, as in the second embodiment, two planes, namely, the first reference plane K1 and the intermediate reference plane K3, are used as a reference, but the second reference plane K2 is not used.

Figure 9:
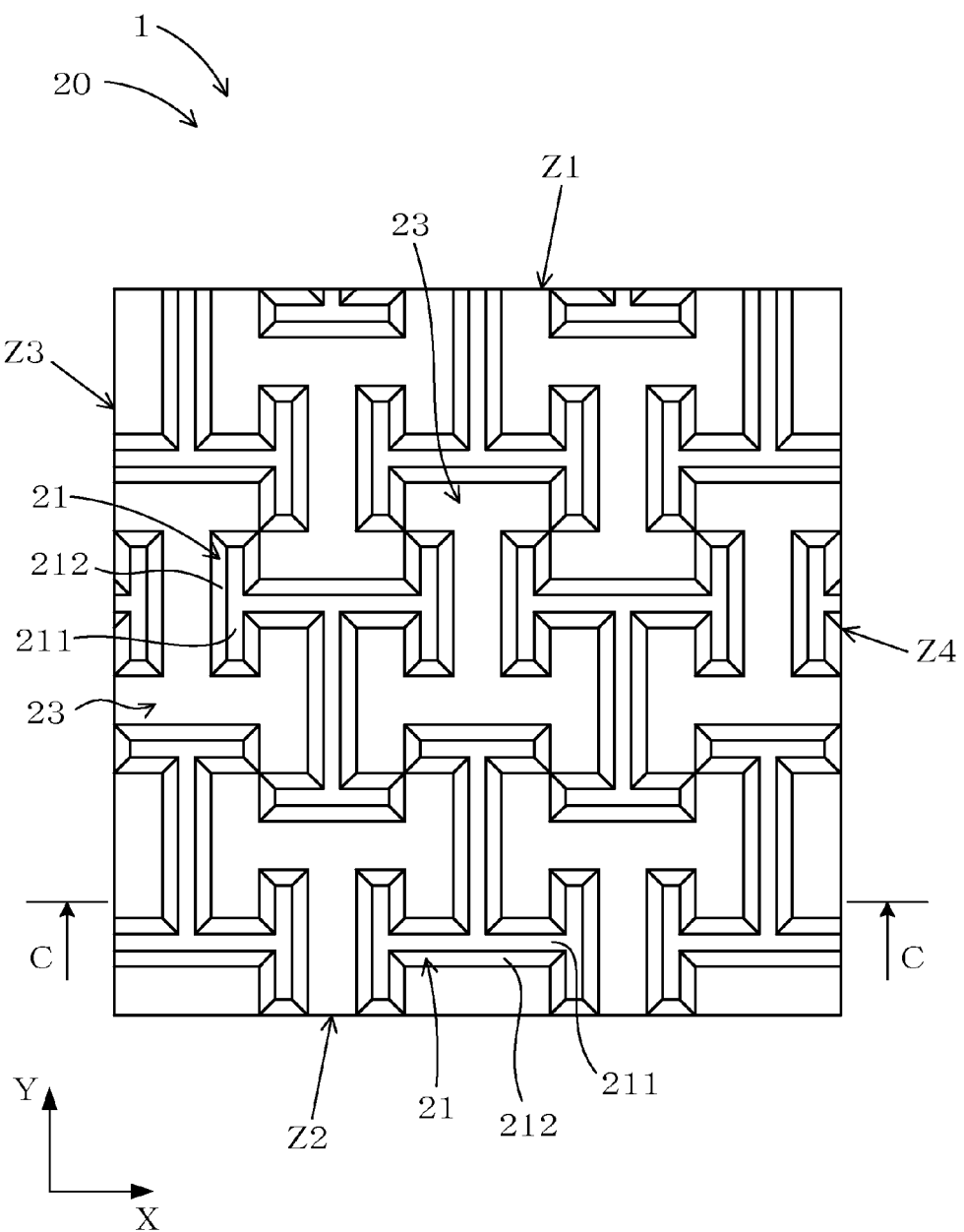
FIG. 9 is a plan view of a sheet material having a concave-convex part according to a third embodiment.
Figure 10:
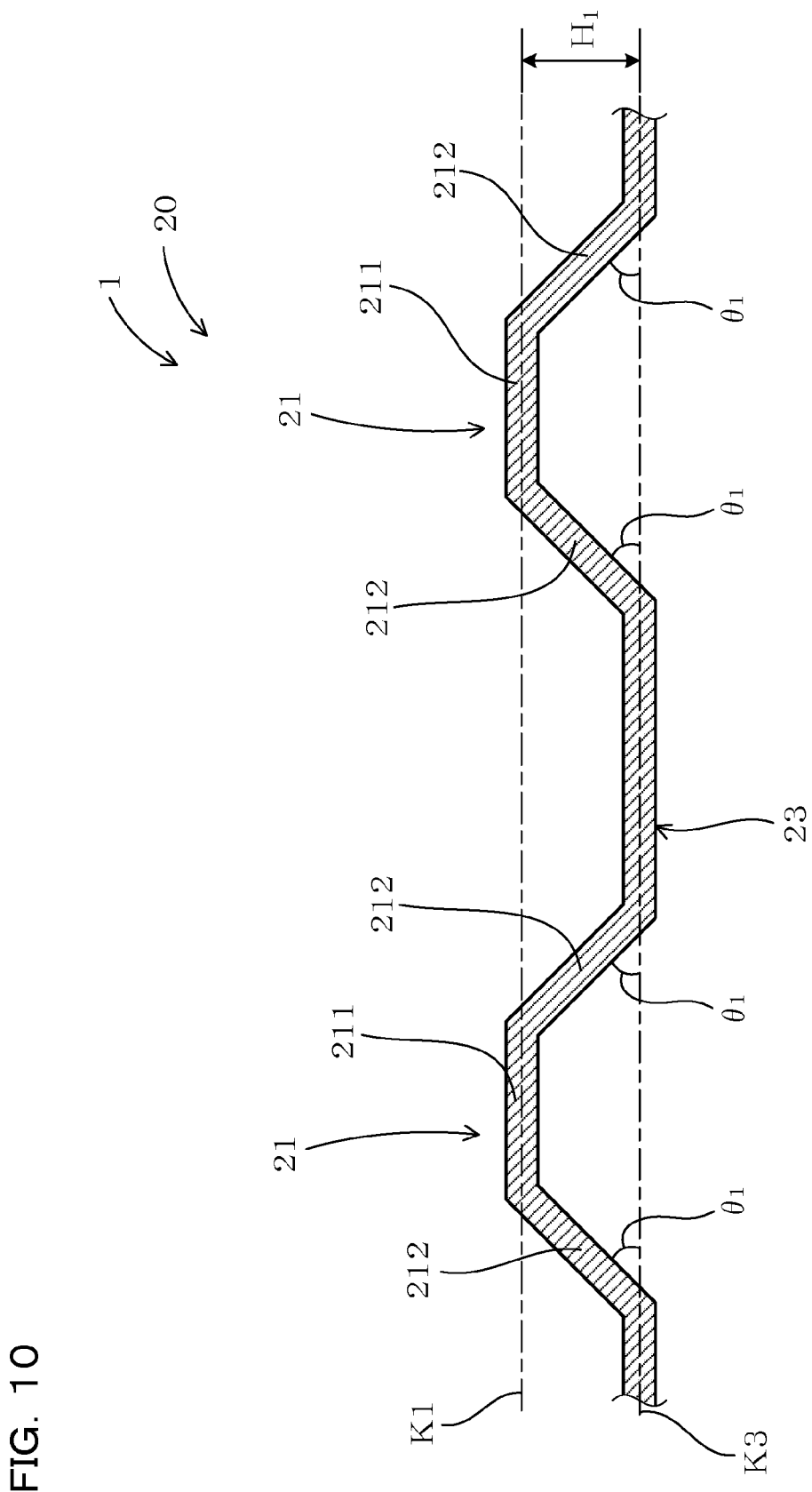
FIG. 10 is a partial enlarged cross sectional view of an auxiliary cross section taken along the C-C line in FIG. 9.

The sheet material 1 shown in FIG. 9 has the concave-convex part 20, which comprises the first areas 21 and plane areas 23 as shown in FIG. 10. The plane areas 23 are formed by the contours of the second reference areas 223 (FIG. 6) in the intermediate reference plane K3 (FIG. 6), as shown in FIG. 9 and FIG. 10. In addition, the configuration of the first areas 21 is the same as in the first embodiment.

(FEM Analysis)

To quantitatively determine the stiffness increase effect of the sheet material 1 of the present embodiment, a bending stiffness evaluation of a cantilevered beam was performed by FEM analysis.

In the FEM analysis, the bending stiffness evaluation was performed in three directions, namely, 0°, 45°, and 90°, by changing the forming direction of the concave-convex part 20 in a test piece.

The test piece used in the FEM analysis has a rectangular shape measuring 120×120 mm, and the concave-convex part 20 is formed over the entire surface thereof. Furthermore, taking the increase in the surface area into consideration, the sheet thickness t was 0.285 mm.

With reference to the end parts of the test piece, one end was designated as a fixed end, and the end part disposed opposing that fixed end was designated as a free end. A load of 1 N was applied to the center part of the side formed by the free end, and the amount of deflection of the sheet material 1 was derived by performing the FEM analysis.

The evaluation was performed by comparing the amount of deflection obtained by conducting the same FEM analysis on the flat sheet shaped original sheet whereon the concave-convex part 20 is not formed.

<0° Direction>

As shown in FIG. 9, in the test piece wherein the concave-convex part 20 is formed such that the X directions in the intermediate reference plane K3 (FIG. 6) and the sides formed by the sheet material 1 are parallel, the direction wherein the end part Z1 located above in the same figure is the fixed end and the end part Z2 opposing the end part Z1 is the free end is designated the 0° direction.

The sheet material 1 that has the concave-convex part 20 of the third embodiment was compared, in the 0° direction discussed above, with the flat sheet shaped original sheet, and it was obvious that the bending stiffness increased by 6.34 times.

<45° Direction>

In the test piece wherein the concave-convex part 20 is formed such that the angle formed between the X directions in the intermediate reference plane K3 (FIG. 6) and the sides of the sheet material 1 is 45°, the direction wherein one end part is the fixed end and an end part opposing the fixed end is the free end is designated the 45° direction.

The sheet material 1 that has the concave-convex part 20 of the first embodiment was compared, in the 45° direction discussed above, with the flat sheet shaped original sheet, and it was obvious that the bending stiffness increased by 5.54 times.

<90° Direction>

As shown in FIG. 9, in the test piece wherein the concave-convex part 20 is formed such that the X directions in the intermediate reference plane K3 (FIG. 6) and the sides of the sheet material 1 are parallel, the direction wherein the end part Z3 located on the left side in the same figure is the fixed end and the end part Z4 opposing the end part Z3 is the free end is designated the 90° direction.

The sheet material 1 that has the concave-convex part 20 of the third embodiment was compared, in the 90° direction discussed above, with the flat sheet shaped original sheet, and it was obvious that the bending stiffness increased by 6.42 times.

In the 0°, 45°, and 90° directions, too, it is obvious that the sheet material 1 that has the concave-convex part 20 described in the present example exhibits a superior bending stiffness increase effect and extremely low bending stiffness anisotropy. In addition, with respect to the sheet material 1 that has the concave-convex part 20 described in the present embodiment, in the 45° direction, which is the direction in which the bending stiffness increase effect is the lowest, the stiffness multiplier G is expected to be 5.54 times that of a flat sheet, and the weight reduction factor W (%) is expected to be at least approximately 43% of a flat sheet. Furthermore, the weight reduction factor W (%) is derived using the stiffness multiplier G based on the formula $W=(1-1/\sqrt[3]{G})\times 100$.

In addition, in the present embodiment, the shape of the concave-convex part 20 in the 135° direction is the same as in the 45° direction, and the shape of the concave-convex part 20 in the 180° direction is the same as in the 0° direction. Accordingly, the result of the FEM analysis is the same for both the 135° direction and the 45° direction, and is likewise the same for the 180° direction and the 0° direction.

Fourth Embodiment

Figure 11:
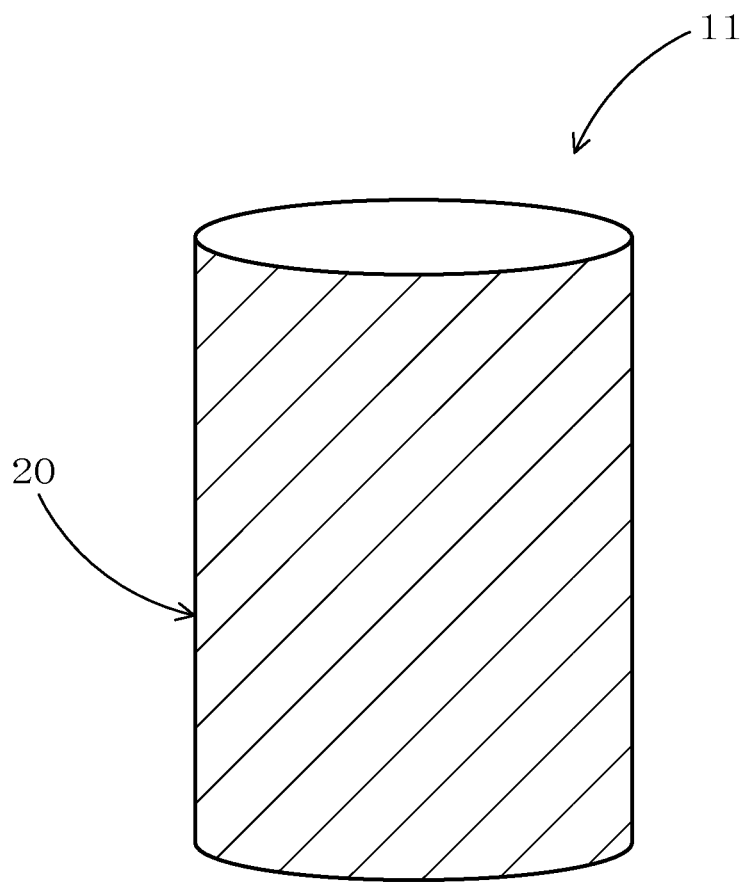
FIG. 11 is an explanatory diagram that shows, according to a fourth embodiment, a cylindrical member that comprises the concave-convex part.

The present embodiment, as shown in FIG. 11, is an example wherein the concave-convex part 20 is provided to a cylindrical member 11. In the present embodiment, the first reference plane K1, the intermediate reference plane K3, and the second reference plane K2 are cylindrical curved planes that are disposed parallel to one another. The intermediate reference plane K3 in the present embodiment is the planar intermediate reference plane K3 according to any one of the first through third embodiments that has been bent into a cylindrical shape. The configurations of the first areas 21, the second areas 22, and the plane areas 23, which constitute the concave-convex part 20, are the same as in the first and second embodiments.

As described in the present embodiment, the sheet material 1 that has the concave-convex part 20 provided with superior characteristics can be deformed into a variety of shapes, thereby expanding its range of application.

In addition, by using a cylindrical structure like a beverage can or a rocket, it is possible to increase the stiffness of the cylindrical member 11 that has the concave-convex part 20 described in the present embodiment without increasing the sheet thickness of the material. In addition, the cylindrical member 11 of the present embodiment has superior energy absorption characteristics. Consequently, using such in a vehicle body of an automobile and the like imparts high stiffness and superior energy absorption characteristics.

Fifth Embodiment

Figure 12:
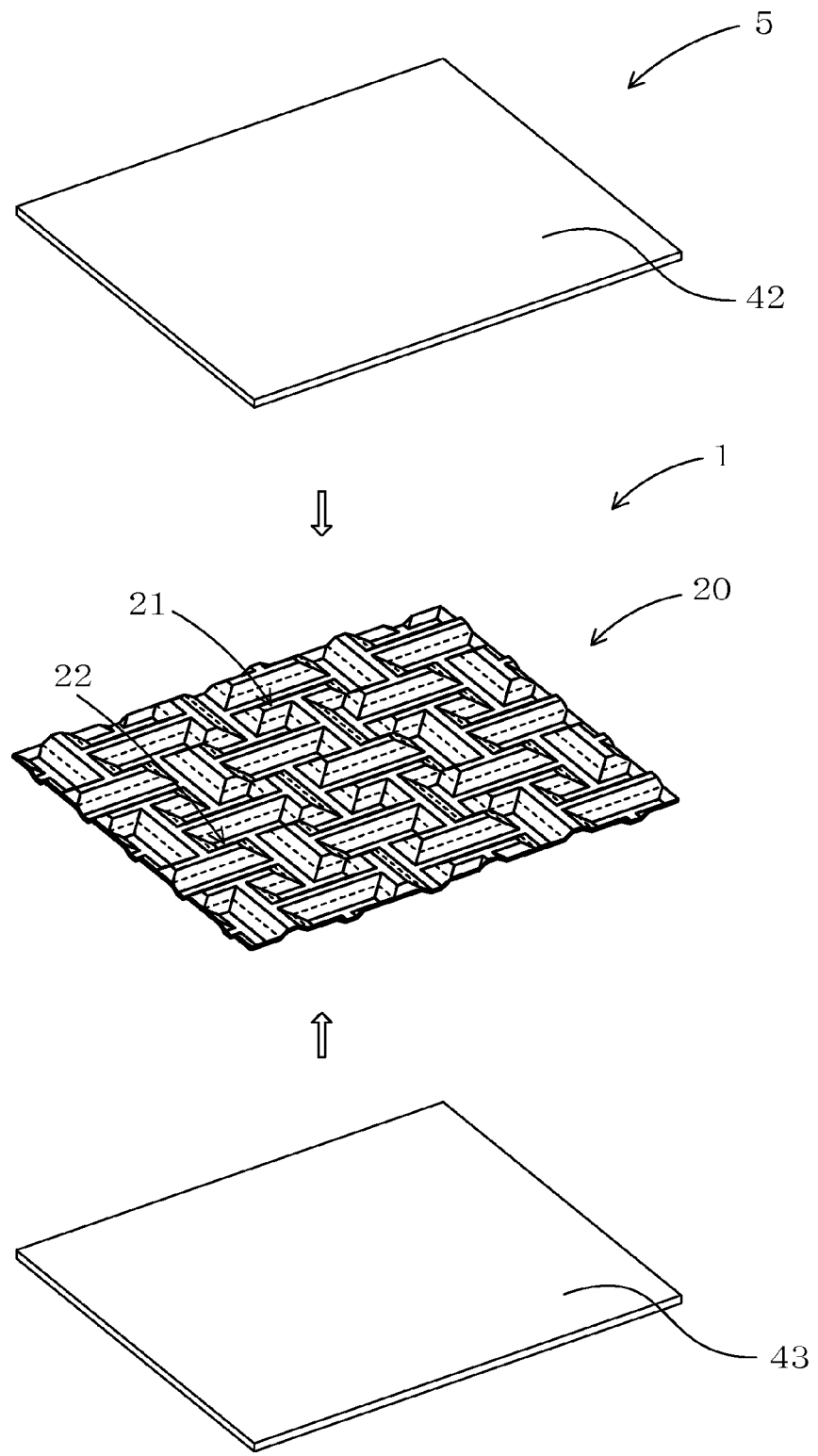
FIG. 12 is an explanatory development view of a laminated structure according to a fifth embodiment.

The present embodiment, as shown in FIG. 12, is an example wherein a laminated structure 5 is configured using as the core material the sheet material 1 that has the concave-convex part 20 of the first embodiment.

Namely, the laminated structure 5 joins face sheets 42, 43 to the surfaces on both sides of the core material, which consists of one sheet material 1 that has the concave-convex part 20.

The face sheets 42, 43 are aluminum alloy sheets that are made of 3000 series material and whose sheet thickness is 1.0 mm.

In the laminated structure 5 of the present embodiment, the sheet material 1 that has the concave-convex part 20, which has superior stiffness as discussed above, is used as the core material, and the face sheets 42, 43 are joined, by bonding, brazing, and the like, to the first top surfaces 211 of the first areas 21 and the second top surfaces 221 of the second areas 22; thereby, the laminated structure 5 obtains a remarkably higher stiffness than the sheet material 1 that has the concave-convex part 20 does as a standalone. Moreover, because both the sheet material 1 and the face sheets 42, 43 are aluminum alloy sheets, the weight is also reduced.

In addition, it is possible to obtain the effect of improving the damping characteristics attendant with the increase in stiffness, and to obtain the effect of improving the sound absorbing characteristics by virtue of containing air layers. In addition, as is well known, the sound absorbing characteristics can be further improved via the formation of a through hole in either of the face sheets 42, 43 so as to form a Helmholtz sound-absorbing structure.

Furthermore, it is also possible to use, as the face sheets 42, 43, a sheet made of resin or a metal other than an aluminum alloy, for example, a steel sheet or a titanium sheet.

Sixth Embodiment

Figure 13:
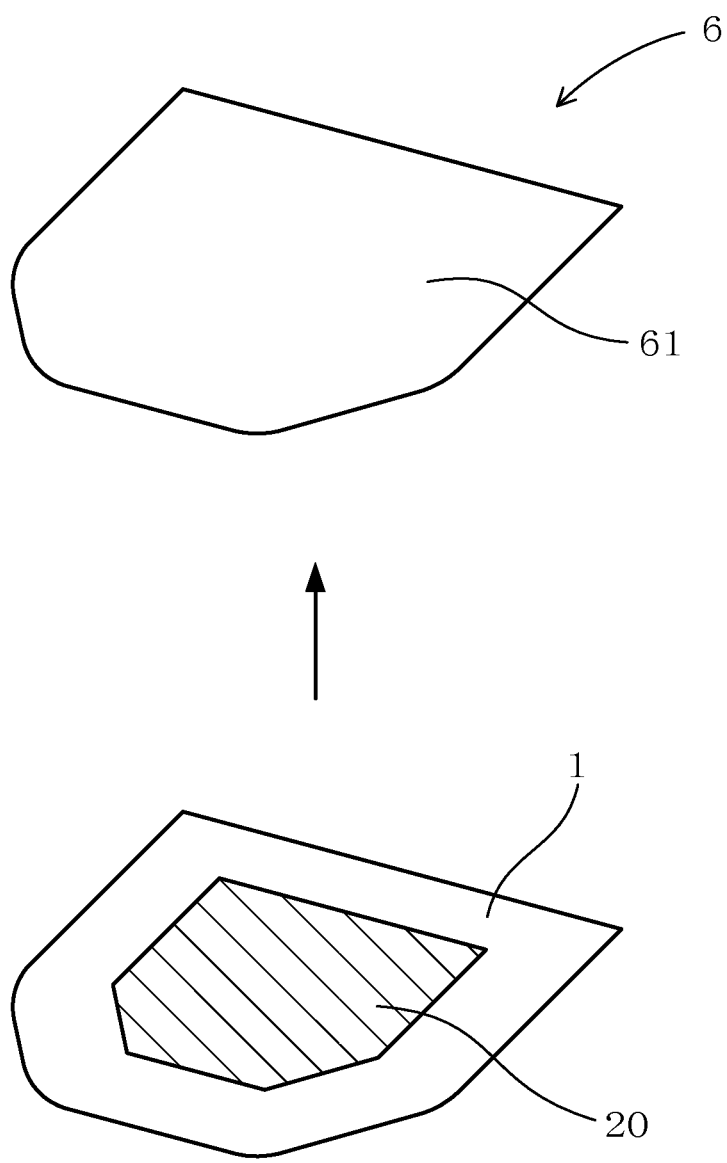
FIG. 13 is an explanatory development view of a vehicle panel according to a sixth embodiment.

The present embodiment, as shown in FIG. 13, is an example of a vehicle panel 6 that is configured by using as the inner panel the sheet material 1 according to any one of the first through third embodiments and by disposing the surfaces of the sheet material 1 on the first reference plane K1 side toward a rear surface side of an outer panel 61. The outer panel 61 is joined, by hemming and the like, to an outer circumferential part of the inner panel. Furthermore, in the inner panel discussed above, the forming direction of the concave-convex part 20 is not limited; for example, a configuration can also be adopted wherein the surface of the sheet material 1 on the side opposite to the first reference plane K1 is disposed such that it faces the rear surface side of the outer panel 61.

In the vehicle panel 6 of the present embodiment, the sheet material 1 that has the concave-convex part 20 and that constitutes the inner panel of the vehicle panel 6 obtains an excellent stiffness increase effect, as mentioned above, and therefore has the excellent characteristic of absorbing the energy of a primary impact as well as the energy of a secondary impact in the event the vehicle collides with a pedestrian. In addition, it is possible to obtain the damping improvement effect attendant with the increase in stiffness, and to obtain the sound absorption improvement effect by virtue of containing air layers.

Furthermore, in the present embodiment, the sheet material 1 that has the concave-convex part 20 is used as the inner panel, but the sheet material 1 can also be used as the inner panel or the outer panel 61, or both.

The invention claimed is:

1. A sheet material having a stiffness-increasing concave-convex part, wherein
a first reference plane, an intermediate reference plane, and a second reference plane, which are three virtual planes that are successively disposed spaced apart and parallel to one another, serve as a reference system;
first unit areas and second unit areas are virtual rectangles of the same size, and extend in a grid in the intermediate reference plane;
directions parallel to one side of each of the virtual rectangles are defined as X directions, and directions perpendicular to the X directions are defined as Y directions;
in each of the first unit areas and the second unit areas, the virtual rectangles are respectively partitioned by a virtual lattice such that a side extending in the X directions is divided into three equal parts and a side extending in the Y directions is divided into five equal parts, wherein fifteen virtual squares are defined within the virtual lattice;
the virtual square at any arbitrary one corner of the first unit areas and the second unit areas is designated as a reference square, a row that comprises virtual squares disposed in the X directions and that includes the reference square is designated a first row, successively adjacent rows are designated as second through fifth rows, a row that comprises virtual squares disposed in the Y directions and that includes the reference square is designated as a row A, and
successively adjacent rows are designated as rows B and C;
in each of the first unit areas, all the virtual squares disposed in the first row and the fifth row are first virtual squares, and, in the second row through the fourth row, the virtual squares disposed in the row A and the row C are second squares and the virtual squares disposed in the row B are first virtual squares;
in each of the second unit areas, all the virtual squares disposed in the first row and the fifth row are second virtual squares, and, in the second row through the fourth row, the virtual squares disposed in the row A and the row C are first virtual squares and the virtual squares disposed in the row B are second virtual squares;
in the intermediate reference plane, the first unit areas and the second unit areas are disposed with the same orientation, and, in the Y directions, a plurality of unit area rows, wherein the first unit areas and the second unit areas are alternately disposed in one row, is formed;
the unit area rows that are adjacent in the X directions in the intermediate reference plane are disposed at positions shifted from one another by three virtual squares in the Y directions;
in the intermediate reference plane, a first icosagonal area that comprises the first virtual squares that share adjacent sides is designated as a first reference area, and a second icosagonal area that comprises the second virtual squares that share adjacent sides is designated as a second reference area;
the concave-convex part is provided with first areas, which protrude from the first reference areas defined in the intermediate reference plane toward the first reference plane, and is provided with either or both of (i) second areas, which protrude from the second reference areas defined in the intermediate reference plane toward the first reference plane or the second reference plane, and (ii) plane areas, which are formed based on the second reference areas in the intermediate reference plane;

each of the first areas comprises a first top surface, which is a projection of the first reference area into the first reference plane and has an area equal to or less than the first reference area, and first side surfaces, which connect an outer periphery of that first top surface with an outer periphery of its first reference area; and each of the second areas comprises a second top surface, which is a projection of the second reference area into the first reference plane or the second reference plane and has an area equal to or less than the first reference area, and second side surfaces, which connect an outer periphery of that second top surface with an outer periphery of its second reference area.

2. The sheet material according to claim 1, wherein
a first inclination angle $\theta_1$ (°) of the first side surface with respect to the second reference plane is within the range of 10°-90°; and a second inclination angle $\theta_2$ (°) of the second side surface with respect to the second reference plane is within the range of 10°-90°.

3. The sheet material according to claim 1, wherein
at least a part of the sheet material is curved.

4. The sheet material according to claim 1, wherein
the concave-convex part is formed by press forming or roll forming a metal sheet.

5. The sheet material according to claim 4, wherein
the metal sheet prior to the press forming or the roll forming has a sheet thickness t (mm) of 0.03-6.0 mm.

6. The sheet material according to claim 5, wherein
a ratio L/t of the length L (mm) of one side of each virtual square to the sheet thickness t (mm) is 10-2000.

7. The sheet material according to claim 5, wherein
a ratio H1/t of a projection height H1 (mm) of the first area to the sheet thickness t (mm), and a maximum inclination angle $\theta_1$ (°) formed between each first side surface and the intermediate reference plane satisfy the relationship $1 \leq (H1/t) \leq -3\theta_1 + 272$; and a ratio H2/t of a projection height H2 (mm) of the second area to the sheet thickness t (mm), and a maximum inclination angle $\theta_2$ (°) formed between each second side surface and the intermediate reference plane satisfy the relationship $1 \leq (H2/t) \leq 3\theta_2 + 272$.

8. The sheet material according to claim 7, wherein
the first maximum inclination angle $\theta_1$ (°) of the first side surface with respect to the second reference plane is within the range of 10°-70°; and the second maximum inclination angle $\theta_2$ (°) of the second side surface with respect to the second reference plane is within the range of 10°-70°.

9. The sheet material according to claim 8, wherein
the first and second maximum inclination angles are each 30°.

10. The sheet material according to claim 8, wherein
a ratio L/t of the length L (mm) of one side of each virtual square to the sheet thickness t (mm) is 10-2000.

11. A sheet material having a stiffness-increasing concave-convex part, wherein
a first reference plane, an intermediate reference plane, and a second reference plane, which are three virtual planes that are successively disposed spaced apart and parallel to one another, serve as a reference system;

first unit areas and second unit areas are virtual rectangles of the same size, and extend in a grid in the intermediate reference plane;

directions parallel to one side of each of the virtual rectangles are defined as X directions, and directions perpendicular to the X directions are defined as Y directions;

in each of the first unit areas and the second unit areas, the virtual rectangles are respectively partitioned by a virtual lattice such that a side extending in the X directions is divided into three equal parts and a side extending in the Y directions is divided into five equal parts, wherein fifteen virtual boxes are defined within the virtual lattice;

the virtual box at any arbitrary one corner of the first unit areas and the second unit areas is designated as a reference box, a row that comprises virtual boxes disposed in the X directions and that includes the reference box is designated a first row, successively adjacent rows are designated as second through fifth rows, a row that comprises virtual boxes disposed in the Y directions and that includes the reference box is designated as a row A, and successively adjacent rows are designated as rows B and C;

in each of the first unit areas, all the virtual boxes disposed in the first row and the fifth row are first virtual boxes, and, in the second row through the fourth row, the virtual boxes disposed in the row A and the row C are second boxes and the virtual boxes disposed in the row B are first virtual boxes;

in each of the second unit areas, all the virtual boxes disposed in the first row and the fifth row are second virtual boxes, and, in the second row through the fourth row, the virtual boxes disposed in the row A and the row C are first virtual boxes and the virtual boxes disposed in the row B are second virtual boxes;

in the intermediate reference plane, the first unit areas and the second unit areas are disposed with the same orientation, and, in the Y directions, a plurality of unit area rows, wherein the first unit areas and the second unit areas are alternately disposed in one row, is formed;

the unit area rows that are adjacent in the X directions in the intermediate reference plane are disposed at positions shifted from one another by three virtual boxes in the Y directions;

in the intermediate reference plane, a first icosagonal area that comprises the first virtual boxes that share adjacent sides is designated as a first reference area, and a second icosagonal area that comprises the second virtual boxes that share adjacent sides is designated as a second reference area;

the concave-convex part is provided with first areas, which protrude from the first reference areas defined in the intermediate reference plane toward the first reference plane, and is provided with either or both of (i) second areas, which protrude from the second reference areas defined in the intermediate reference plane toward the first reference plane or the second reference plane, and (ii) plane areas, which are formed based on the second reference areas in the intermediate reference plane;

each of the first areas comprises a first top surface, which is a projection of the first reference area into the first reference plane and has an area equal to or less than the first reference area, and first side surfaces, which connect an outer periphery of that first top surface with an outer periphery of its first reference area; and each of the second areas comprises a second top surface, which is a projection of the second reference area into the first reference plane or the second reference plane and has an area equal to or less than the first reference area, and second side surfaces, which connect an outer periphery of that second top surface with an outer periphery of its second reference area, wherein the virtual boxes that comprise the first and second icosagonal area have a length L (mm) of one side of each virtual box and a length M (mm) of a side that is orthogonal to the one side that satisfy the relationship $0.5 L \leq M \leq 2 L$.

12. The sheet material according to claim 11, wherein
a first inclination angle $\theta_1$ (°) of the first side surface with respect to the second reference plane is within the range of 10°-90°; and
a second inclination angle $\theta_2$ (°) of the second side surface with respect to the second reference plane is within the range of 10°-90°.

13. The sheet material according to claim 11, wherein
at least a part of the sheet material is curved.

14. The sheet material according to claim 11, wherein
the concave-convex part is formed by press forming or roll forming a metal sheet.

15. The sheet material according to claim 14, wherein
the metal sheet prior to the press forming or the roll forming has a sheet thickness t (mm) of 0.03-6.0 mm.

16. The sheet material according to claim 15, wherein
a ratio L/t of the length L (mm) of one side of each virtual box to the sheet thickness t (mm) is 10-2000.

17. The sheet material according to claim 15, wherein
a ratio $H_1/t$ of a protrusion height $H_1$ (mm) of the first area to the sheet thickness t (mm), and a maximum inclination angle $\theta_1$ (°) formed between each first side surface and the intermediate reference plane satisfy the relationship $1 \leq (H_1/t) \leq -3\theta_1 + 272$; and
a ratio $H_2/t$ of a protrusion height $H_2$ (mm) of the second area to the sheet thickness t (mm) and a maximum inclination angle $\theta_2$ (°) formed between each second side surface and the intermediate reference plane satisfy the relationship $1 \leq (H_2/t) \leq -3\theta + 272$.

18. The sheet material according to claim 17, wherein
the first maximum inclination angle $\theta_1$ (°) of the first side surface with respect to the second reference plane is within the range of 10°-70°; and
the second maximum inclination angle $\theta_2$ (°) of the second side surface with respect to the second reference plane is within the range of 10°-70°.

19. The sheet material according to claim 18, wherein
the first and second maximum inclination angles are each 30°.

20. The sheet material according to claim 18, wherein
a ratio L/t of the length L (mm) of one side of each virtual box to the sheet thickness t (mm) is 10-2000.

* * * * *